United States Patent
Ganesh

(10) Patent No.: US 7,561,544 B2
(45) Date of Patent: Jul. 14, 2009

(54) MACHINE ARCHITECTURE FOR EVENT MANAGEMENT IN A WIRELESS SENSOR NETWORK

(75) Inventor: Arul Ganesh, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 624 days.

(21) Appl. No.: 10/974,198

(22) Filed: Oct. 27, 2004

(65) Prior Publication Data

US 2006/0098594 A1    May 11, 2006

(51) Int. Cl.
H04W 4/00    (2009.01)

(52) U.S. Cl. ...................... 370/328; 455/418
(58) Field of Classification Search ............... 370/328; 705/59; 455/418; 395/670, 406; 396/406
See application file for complete search history.

(56) References Cited

U.S. PATENT DOCUMENTS

| | | | |
|---|---|---|---|
| 4,843,606 A * | 6/1989 | Bux et al. ............... 370/402 |
| 5,245,608 A | 9/1993 | Deaton, Jr. et al. |
| 5,774,461 A * | 6/1998 | Hyden et al. ............ 370/310.2 |
| 5,892,769 A * | 4/1999 | Lee ........................ 370/447 |
| 6,195,760 B1 | 2/2001 | Chung et al. |
| 6,266,781 B1 | 7/2001 | Chung et al. |
| 6,295,447 B1 * | 9/2001 | Reichelt et al. ........... 455/417 |
| 6,366,826 B1 | 4/2002 | Mead et al. |
| 6,411,991 B1 | 6/2002 | Helmer et al. |
| 6,437,692 B1 | 8/2002 | Petite et al. |
| 6,522,628 B1 * | 2/2003 | Patel et al. ............... 370/230.1 |
| 6,611,834 B1 | 8/2003 | Aggarwal et al. |
| 7,020,501 B1 * | 3/2006 | Elliott et al. ............. 455/574 |
| 7,069,027 B2 * | 6/2006 | Miriyala ................. 455/456.4 |
| 7,076,211 B2 * | 7/2006 | Donner et al. ........... 455/41.2 |
| 2002/0013802 A1 * | 1/2002 | Mori et al. .............. 709/1 |
| 2002/0088926 A1 | 7/2002 | Prasser |
| 2003/0008684 A1 * | 1/2003 | Ferris ...................... 455/561 |
| 2003/0129944 A1 * | 7/2003 | Chang et al. ............ 455/41 |
| 2003/0135533 A1 | 7/2003 | Cook |
| 2003/0149741 A1 * | 8/2003 | Krooss .................... 709/217 |
| 2003/0161327 A1 | 8/2003 | Vlodavsky et al. |
| 2003/0174731 A1 | 9/2003 | Tafazolli et al. |
| 2003/0177275 A1 | 9/2003 | Lind et al. |
| 2003/0178273 A1 | 9/2003 | Bullmann et al. |

(Continued)

OTHER PUBLICATIONS

Bass, "Publish-Subscribe Enabled Multisensor Data Fusion", The Federation of Critical Infrastructure Information, Jul. 10, 2002, pp. 1-29, Publisher: www.silkroad.com.

(Continued)

Primary Examiner—Rafael Pérez-Gutiérrez
Assistant Examiner—Nimesh Patel
(74) Attorney, Agent, or Firm—Fogg & Powers LLC

(57) ABSTRACT

A wireless sensor node comprises a wireless transceiver to communicate over a wireless communication link with at least one other node in a wireless sensor network, a sensor interface to receive sensor data from a sensor, and a programmable processor coupled to the sensor interface and the wireless transceiver. The programmable processor executes program instructions that implement a virtual machine for executing an event program that is generated from a query. The event program comprises a plurality of instructions, each instruction being associated with an event. The virtual machine allocates a token data structure for each of event and manages the execution of the plurality of instructions using the token data structures.

9 Claims, 18 Drawing Sheets

U.S. PATENT DOCUMENTS

| | | | |
|---|---|---|---|
| 2003/0233485 | A1 | 12/2003 | Khan |
| 2004/0142682 | A1* | 7/2004 | Kamiya et al. ............... 455/418 |
| 2004/0174855 | A1* | 9/2004 | Foster et al. ................ 370/348 |
| 2004/0199613 | A1* | 10/2004 | Hundscheidt et al. ....... 709/220 |
| 2004/0266480 | A1* | 12/2004 | Hjelt et al. .................. 455/558 |
| 2005/0057370 | A1 | 3/2005 | Warrior et al. |
| 2005/0060704 | A1* | 3/2005 | Bulson et al. .................. 718/1 |
| 2006/0005132 | A1* | 1/2006 | Herdeg ....................... 715/704 |
| 2006/0181406 | A1* | 8/2006 | Petite et al. ................. 340/521 |
| 2007/0180436 | A1* | 8/2007 | Travostino et al. .......... 717/138 |
| 2008/0112313 | A1* | 5/2008 | Terakawa ................... 370/229 |

OTHER PUBLICATIONS

Bates et al., "Using Events for the Scalable Federation of Heterogeneous Components", 8th ACM SIGOPS European Workshop on Support for Composing Distributed Applications, Sep. 1998, pp. 1-8, Publisher: ACM.

Govindan et al., "The Sensor Network as a Database", 2002, pp. 1-8.

Heinzelman et al., "Energy-Efficient Communication Protocol for Wireless Microsensor Networks", Proceeds of the 33rd Hawaii International Conference on System Sciences, Jan. 2000, pp. 1-10, Publisher: IEEE.

Hellerstein et al., "Beyond Average: Toward Spohisticated Sensing With Queries", Workshop on Information Processing in Sensor Networks (IPSN), 2003, pp. 1-16.

Huang et al., "Publish/Subscribe in a Mobile Environment", 2nd ACM International Workshop on Data Engineering for Wireless and Mobile Access (MobiDE), 2001, pp. 1-8, Publisher: ACM.

Intanagonwiwat et al., "Directed Diffusion: A Scalable and Robust Communication Paradigm for Sensor Networks", Proceedings of the 6th Annual ACM International Conference on Mobile Computing and Networking, Aug. 2000, pp. 56-67, Publisher: ACM.

Madden et al., "Supporting Aggregate Queries Over Ad-Hoc Wireless Sensor Networks", Proceedings of 4th IEEE Workshop on Mobile Computing and Systems Applications, 2002, pp. 1-10, Publisher: IEEE.

Sadagopan et al., "Active Query Forwarding in Sensor Networks", Ad Hoc Networks 3, 2005, pp. 91-113, Publisher: Elsevier B.V.

Safari, "Practical Cisco Routers", http://proquest.safaribooksonline.com/0789721031, 2007, pp. 1-8, Publisher: Safari Books Online.

Vogels et al., "The Design and Architecture of the Microsoft Cluster Service—A Practical Approach to High-Availability and Scalability", Proceedings of FTCS'98, 1998, pp. 1-10, Publisher: IEEE.

Wan et al., "PSFQ: A Reliable Transport Protocol for Wireless Sensor Networks", Proceedings of the 8th Annual International Conference on Mobile Computing and Networking, 2002, pp. 1-11, Publisher: ACM.

Yang et al., "A Publish/Subscribe Scheme for Peer-to-Peer Database Networks", COOPIS/DOA/ODBASE 2003, LNCS 2888, 2003, Publisher: Springer-Verlag Berlin Heidelberg.

\* cited by examiner

| | |
|---|---|
| Event-Filer →Subscribe-Event-Filter<br>            \| Publish-Event-Filter<br>            \| Install-Event-Filter<br>            \| Uninstall-Event-Filter<br>            \| Suspend-Event-Filter<br>            \| Resume-Event-Filter<br>            \| Drop-Event-Filter<br>            \| Modify-Event-Filter<br>            \| Activate-Event-Filter<br>            \| Defer-Event-Filter | |
| Subscribe-Event-Filter →SUBSCRIBE EVENT (parameter\|aggregation-operation[, parameter\| aggregation-operation]...) OF data-source [ACTIVATE [IMMEDIATE\|time-expression\|expression]][WHEN when-condition]] [LIFETIME INFINITE\|ONCE\|time-expression] [event-filter-constraint [,event-filter-constraint]] | |
| Publish-Event-Filter →PUBLISH EVENT event-id [(parameter [, parameter]...)] VALUES (parameter-value[, parameter-value]... ) | |
| Install-Event-Filter →INSTALL EVENT event-id | |
| Uninstall-Event-Filter →UNINSTALL EVENT event-id | |
| Suspend-Event-Filter →SUSPEND EVENT event-id | |
| Resume-Event-Filter →RESUME EVENT event-id | |
| Drop-Event-Filter →DROP EVENT event-id | |
| Modify-Event-Filter →MODIFY EVENT event-id SET LIFETIME time-expression | |
| Activate-Event-Filter →ACTIVATE EVENT event-id | |
| Defer-Event-Filter →       DEFER EVENT event-id LIFETIME time-expression | |
| | |
| aggregation-operation →aggregation-operator(expression) | |
| aggregation-operator →decomposible-operator\|non-decomposible-operator | |
| decomposible-operator →MIN \| MAX \| AVERAGE \| SUM | |
| non-decomposible-operator →MEDIAN | |
| digit → 0 \| 1 \| 2 \| 3 \| 4 \| 5 \| 6 \| 7 \| 8 \| 9 | |
| event-id →integer-constant | |
| parameter →integer-constant | |
| integer-constant →digit$^+$ | |
| when-condition →WHEN search-condition | |
| parameter-value →constant-value | |
| data-source →integer-constant | |
| expression →term \| expression {+\|–} term | |
| term →factor \| term {*\|/} factor | |
| unsigned-integer →{digit} | |
| floatingpoint-constant → digit$^+$.digit$^+$ | |
| factor → [+\|–]*primary | |
| Primary → parameter \| ( expression ) \| constant-value | |
| | |
| character-string-type → bool \| byte \| long \| double \| int \| float \| datetime \| char(digit[digit]...) | |
| data-type →character-string-type | |
| comparison-operator → < \| > \| <= \| >= \| = \| <> | |
| comparison-predicate → expression comparison-operator expression | |
| constant-value → integer-constant \| floatingpoint-constant \| character-constant \| string-constant | |
| Boolean-factor → [NOT] boolean-primary | |
| boolean-primary →       comparison-predicate \| ( search-condition ) | |
| boolean-term → boolean-factor [AND boolean-term] | |
| character-constant → 'letter' | |
| search-condition →       boolean-term [OR search-condition] | |
| string-constant → {digit \| letter \| special-character} | |
| user-defined-name → letter{digit \| letter \| _}... | |
| letter → lower-case-letter \| upper-case-letter | |
| lower-case-letter →       a \| b \| c \| d \| e \| f \| g \| h \| i \| j \| k \| l \| m \| n \| o \| p \| q \| r \| s \| t \| u \| v \| w \| x \| y \| z | |
| upper-case-letter →       A \| B \| C \| D \| E \| F \| G \| H \| I \| J \| K \| L \| M \| N \| O \| P \| Q \| R \| S \| T \| U \| V \| W \| X \| Y \| Z | |

| Mnemonic | Opcode | Argument Type | Table Entry (in Bin) | Table Entry (in Hex) | Description |
|---|---|---|---|---|---|
| SBCR | 0000 | 000 | 00000000 | 0 | SUBSCRIBE Statement (⇓) |
| PCAB | 0001 | 000 | 00000001 | 1 | Parallel Composition on set A, B ($_A\|_B$) |
| PCNS | 0010 | 010 | 00000010 | 2 | Parallel Composition without synchronization ($\|_\emptyset$) |
| PRSP | 0011 | 000 | 00000011 | 3 | Positive Feedback Response (/^) |
| PCWS | 0100 | 010 | 00000100 | 4 | Parallel Composition with full synchronization ($\|_\Sigma$) |
| PCSA | 0101 | 000 | 00000101 | 5 | Parallel Composition on set A ($\|_A$) |
| OPIT | 0110 | 011 | 00000110 | 6 | Internalization operation (\σ) |
| PRFX | 0111 | 010 | 00000111 | 7 | Prefix Operator (->.) |
| LFTM | 1000 | 001 | 00001000 | 8 | LIFETIME Operator. The two data operands are time value |
| ACTV | 1001 | 001 | 00001001 | 9 | ACTIVATE Operator. The two data operands are time value |
| EVRY | 1010 | 001 | 00001010 | A | EVERY Operator. The two data operands are time value |
| ASOC | 1011 | 001 | 00001011 | B | ASSOCIATION Operator that associates a data to a region. |
| GRTN | 1100 | 001 | 00001100 | C | GREATER THAN Logical operator |
| LSTN | 1101 | 001 | 00001101 | D | LESS THAN Logical operator |
| EVNT | 1110 | 001 | 00001110 | E | EVENT Operator that generates an event |
| FTCH | 1111 | 001 | 00001111 | F | FETCH the data of the address specified |

SUBSCRIBE EVENT ('124', '125', '126') WHEN (('45' OF '99' > 50 AND '54' OF '99' < 72) OR ('81' OF '99' > 93 AND '90' OF '99' < 105)) ACTIVATE '00:00:05" LIFETIME '00:01:30' EVERY '00:30:00';

| Event Index | Event ID + 1 | Event ID | Parent-Event Index | Parent Event ID | Parent ID (Hex) |
|---|---|---|---|---|---|
| 1 | 1 | 0 | 255 | 255 | FF |
| 2 | 3 | 2 | 1 | 0 | 0 |
| 3 | 5 | 4 | 2 | 2 | 2 |
| 4 | 7 | 6 | 3 | 4 | 4 |
| 5 | 10 | 9 | 3 | 4 | 4 |
| 6 | 13 | 12 | 3 | 4 | 4 |
| 7 | 16 | 15 | 2 | 2 | 2 |
| 8 | 18 | 17 | 7 | 15 | F |
| 9 | 20 | 19 | 8 | 17 | 11 |
| 10 | 22 | 21 | 9 | 19 | 13 |
| 11 | 24 | 23 | 10 | 21 | 15 |
| 12 | 31 | 30 | 10 | 21 | 15 |
| 13 | 38 | 37 | 9 | 19 | 13 |
| 14 | 40 | 39 | 13 | 37 | 25 |
| 15 | 47 | 46 | 13 | 37 | 25 |
| 16 | 54 | 53 | 8 | 17 | 11 |
| 17 | 56 | 55 | 16 | 53 | 35 |
| 18 | 58 | 57 | 17 | 55 | 37 |
| 19 | 64 | 63 | 17 | 55 | 37 |
| 20 | 70 | 69 | 16 | 53 | 35 |

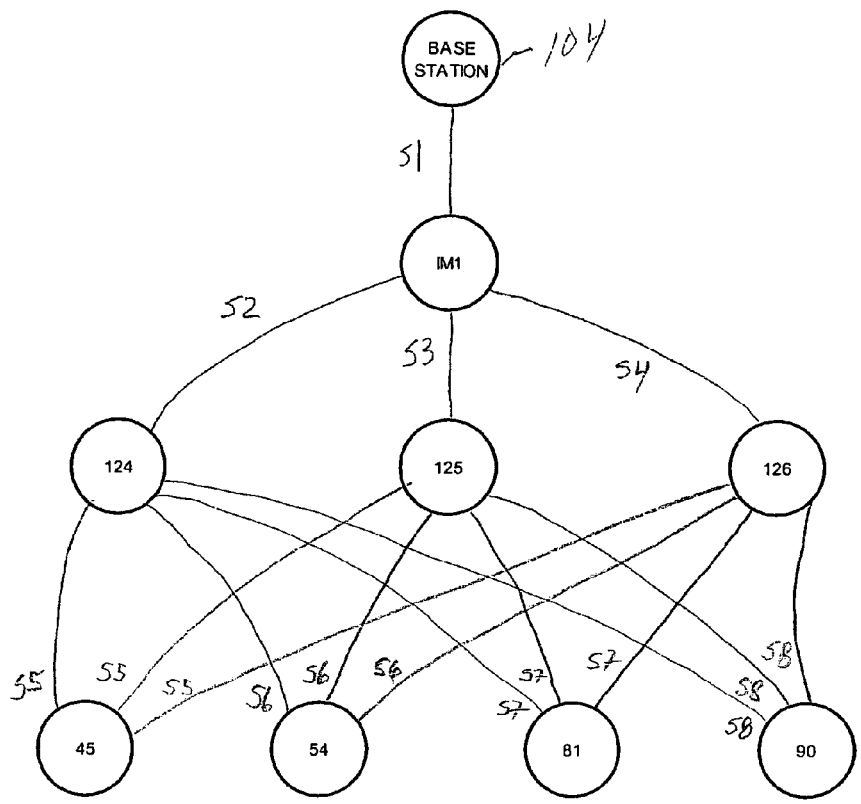

S1: SUBSCRIBE EVENT ('124', '125', '126') WHEN (('45' OF '99' > 50 AND '54' OF '99' < 72) OR ('81' OF '99' > 93 AND '90' OF '99' < 105)) ACTIVATE '00:00:05' LIFETIME '00:01:30' EVERY '00:30:00'

S2: SUBSCRIBE EVENT ('124') WHEN (('45' OF '99' > 50 AND '54' OF '99' < 72) OR ('81' OF '99' > 93 AND '90' OF '99' < 105)) ACTIVATE '00:00:05' LIFETIME '00:01:30' EVERY '00:30:00'

S3: SUBSCRIBE EVENT ('125') WHEN (('45' OF '99' > 50 AND '54' OF '99' < 72) OR ('81' OF '99' > 93 AND '90' OF '99' < 105)) ACTIVATE '00:00:05' LIFETIME '00:01:30' EVERY '00:30:00'

S4: SUBSCRIBE EVENT ('126') WHEN (('45' OF '99' > 50 AND '54' OF '99' < 72) OR ('81' OF '99' > 93 AND '90' OF '99' < 105)) ACTIVATE '00:00:05' LIFETIME '00:01:30' EVERY '00:30:00'

S5: SUBSCRIBE EVENT ('45') WHEN ('45' OF '99' > 50) ACTIVATE '00:00:05' LIFETIME '00:01:30' EVERY '00:30:00'

S6: SUBSCRIBE EVENT ('54') WHEN ('54' OF '99' < 72) ACTIVATE '00:00:05' LIFETIME '00:01:30' EVERY '00:30:00'

S7: SUBSCRIBE EVENT ('81') WHEN ('81' OF '99' > 93) ACTIVATE '00:00:05' LIFETIME '00:01:30' EVERY '00:30:00'

S8: SUBSCRIBE EVENT ('90') WHEN ('90' OF '99' < 105) ACTIVATE '00:00:05' LIFETIME '00:01:30' EVERY '00:30:00'

FIG. 16

MACHINE ARCHITECTURE FOR EVENT MANAGEMENT IN A WIRELESS SENSOR NETWORK

CROSS REFERENCE TO RELATED CASES

This application is related to the following applications filed on even date herewith, all of which are hereby incorporated herein by reference:

U.S. patent application Ser. No. 10/974,216, entitled "EVENT-BASED FORMALISM FOR DATA MANAGEMENT IN A WIRELESS SENSOR NETWORK."

U.S. patent application Ser. No. 10/974,073, entitled "LAYERED ARCHITECTURE FOR DATA MANAGEMENT IN A WIRELESS SENSOR NETWORK."

U.S. patent application Ser. No. 10/974,362, entitled "PUBLISH/SUBSCRIBE MODEL IN A WIRELESS SENSOR NETWORK."

U.S. patent application Ser. No. 10/974,173, entitled "DISCRETE EVENT OPERATORS FOR EVENT MANAGEMENT IN A WIRELESS SENSOR NETWORK."

TECHNICAL FIELD

The following description relates to wireless sensor networks in general and to data management in a wireless sensor network in particular.

BACKGROUND

Systems often include some type of functionality for providing data management. Data management is concerned with providing a logical view of the data that is available in a system. Such a logical view is also referred to here as the "data model" for the system. Data management is also concerned with the underlying physical organization of the data in the system and the transformation between the logical view of the data and the underlying physical organization. In addition, data management is typically concerned with a query mechanism for retrieving data from the system, a frame structure for the data, and the optimization of queries based on various parameters.

One type of system is a wireless sensor network. A wireless sensor network typically include several nodes that communicate with one another over wireless communication links (for example, over radio frequency communication links). One or more of the nodes in the wireless sensor network incorporate (or are otherwise coupled to) a sensor. Such nodes are also referred to here as "wireless sensor nodes" or "sensor nodes." Each sensor is capable of generating a value that, at any given point in time, is indicative of some physical attribute of interest. In one configuration, the sensor nodes are battery powered and have limited computational resources (for example, limited memory and processing capability).

One approach to providing data management in a sensor network employs techniques used in relational database management systems (RDBMS). In such an approach, sensor data generated by sensor nodes in the network are logically organized into tables. Relational algebra is used for specifying the behavior of the logical view of the sensor data. Such an RDBMS approach, however, may not be suitable in a wireless sensor network that makes use of sensor nodes that have limited resources (for example, power, memory, or processing capability).

SUMMARY

In one embodiment, a wireless sensor node comprises a wireless transceiver to communicate over a wireless communication link with at least one other node in a wireless sensor network, a sensor interface to receive sensor data from a sensor, and a programmable processor coupled to the sensor interface and the wireless transceiver. The programmable processor executes program instructions that implement a virtual machine for executing an event program that is generated from a query. The event program comprises a plurality of instructions, each instruction being associated with an event. The virtual machine allocates a token data structure for each of event and manages the execution of the plurality of instructions using the token data structures.

In another embodiment, a virtual machine for executing an event program on a target node included in a wireless sensor network, the event program specifying a plurality of events. The virtual machine comprises a token management subsystem that manages a plurality of token data structures. The token management subsystem allocates to each of the events of the event program a token data structure from the plurality of token data structures that is indicative of the state of that event. The virtual machine further comprises an interrupt management subsystem that manages a plurality of interrupts. The interrupt management subsystem allocates to each of a first subset of the events an interrupt from the plurality of interrupts and configure the target node to generates that interrupt when that event occurs. For each interrupt that is allocated to an event, when that interrupt is generated, the token data structure allocated to that event is updated to indicate that the event has occurred. Each of a second subset of the events has an event handler associated with that event. Each event handler has a set of input token data structures and an output token data structure associated therewith. The token management subsystem causes the event handler to be executed by the target node when a predetermined logical relationship associated with that event handler exists between the set of input token data structures associated with that event handler.

In another embodiment, a wireless sensor node comprises a wireless transceiver to communicate over a wireless communication link with at least one other node in a wireless sensor network, a sensor interface to receive sensor data from a sensor, and a programmable processor coupled to the sensor interface and the wireless transceiver. The programmable processor uses a Petri net-based model to execute an event program that specifies a set of events.

The details of various embodiments of the claimed invention are set forth in the accompanying drawings and the description below. Other features and advantages will become apparent from the description, the drawings, and the claims.

DRAWINGS

FIG. 8 is a Backus-Naur Form of one example of a high-level query language.

FIG. 11 illustrates one example of an instruction set.

FIG. 12 illustrates one example of a query expressed in source form using the grammar set forth above in FIG. 8.

FIG. 14 is a table having a row for each node in the graph shown in FIG. 13.

FIG. 16 illustrates one example of a set of recursive subscriptions that can result from the query of FIG. 12.

Like reference numbers and designations in the various drawings indicate like elements.

DETAILED DESCRIPTION

Figure 1:
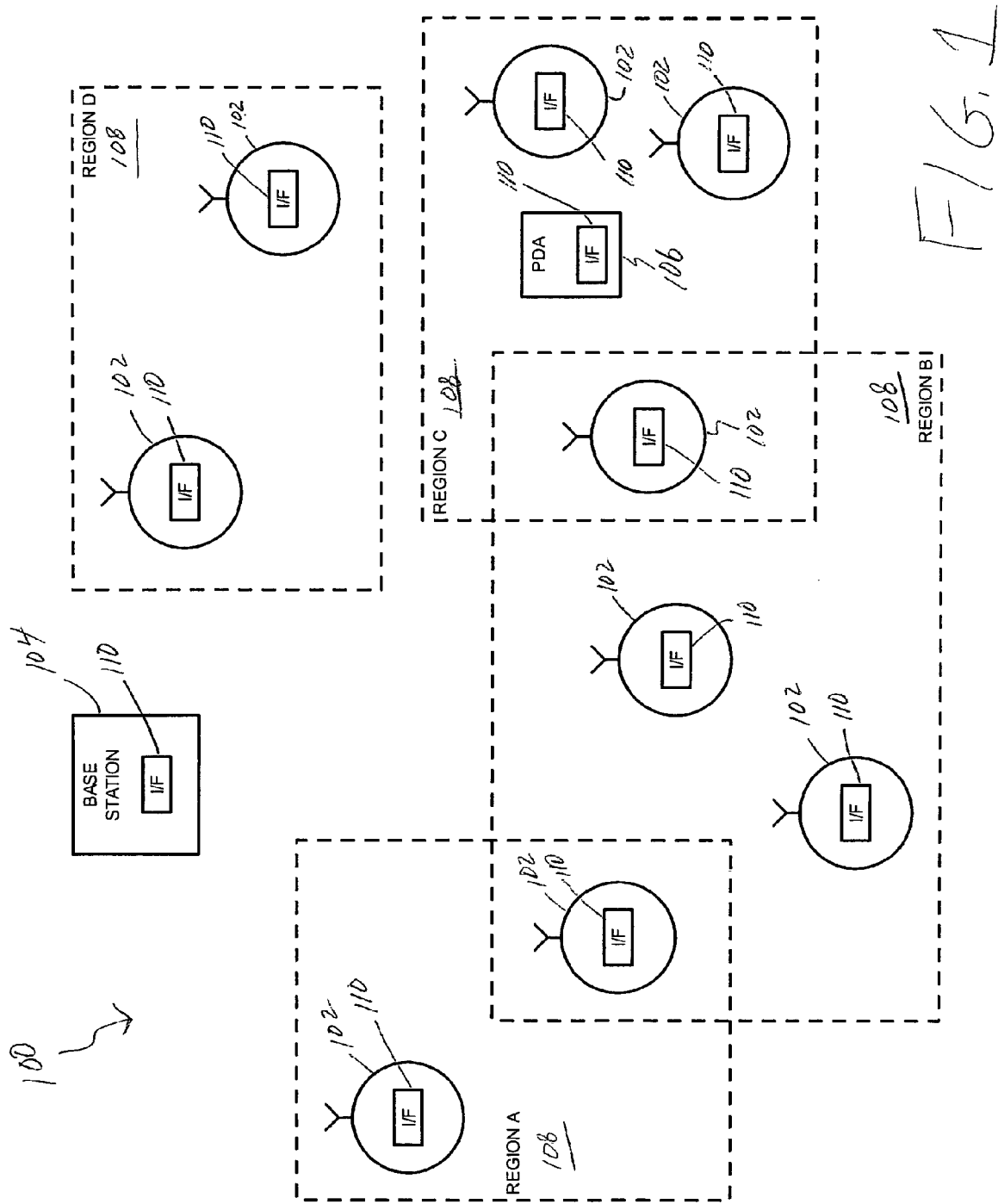
FIG. 1 is a block diagram of one exemplary embodiment of a wireless sensor network.

FIG. 1 is a block diagram of one exemplary embodiment of a wireless sensor network 100. The wireless sensor network 100 includes multiple wireless sensor nodes 102 that communicate with one another and/or a base station 104 using wireless communication links. The nodes of the wireless sensor network 100, in some embodiments, are distributed over a large geographical area. In one embodiment of the wireless sensor network 100, wireless sensor nodes 102 are distributed over an environment that is to be monitored. Each wireless sensor node 102 includes (or is otherwise coupled to) a sensor that is capable of generating a value that, at any given point in time, is indicative of some physical attribute of interest. Each wireless sensor node 102 receives sensor data from a respective sensor.

In one embodiment, the wireless sensor nodes 102 and the base station 104 communicate with one another using radio frequency (RF) communication links. In other embodiments, other wireless communication links (for example, infrared wireless communication links) are used instead of or in addition to RF wireless communication links. In one embodiment, the wireless sensor network 100 is implemented as an ad-hoc, peer-to-peer network. In such an embodiment, the nodes of the wireless sensor network 100 communicate with each other wirelessly using a multi-hop protocol. Such a multi-hop protocol provides a mechanism for a packet (or other unit of data) to be transmitted by a source node to a destination node outside of the wireless transmission range of the source node by transmitting the packet to an intermediate node within the source node's wireless transmission range. The intermediate node then forwards the packet onto the destination node (if the destination node is within the intermediate node's wireless transmission range) or onto another intermediate node within the first intermediate node's wireless transmission range. This forwarding process is repeated until the packet reaches the destination node. In another embodiment, the wireless sensor network 100 is implemented using a different wireless networking approach (for example, using an infrastructure wireless network in which wireless communications are routed through an access point).

The base station 104 provides a static point from which queries can be injected into the wireless sensor network 100 and from which data that is retrieved by such queries can be received. In one embodiment, a user communicates a query to the base station 104. The base station 104 receives the query and injects the query into the wireless sensor network 100. The query propagates to appropriate sensor nodes 102, which communicate data back to the base station 104 (via one or more intermediate nodes) as specified in the query. In one implementation, the base station 104 also acts as a gateway to another network or device not otherwise included in the wireless sensor network 100 from which queries are received and/or to which data retrieved from the wireless sensor network 100 is communicated.

The wireless sensor network 100 can also include other types of nodes. For example, as shown in FIG. 1, a personal digital assistant (PDA) 106 is included in the network 100. The PDA 106 includes a wireless transceiver that enables the PDA 106 to communicate with other nodes in the wireless sensor network 100 over one or more wireless communication links. In one usage scenario, a user uses the PDA 106 to input a query for data from the wireless sensor network 100. The PDA 106 communicates the query to the base station 104 (via one or more intermediate nodes, if necessary). The base station 104 receives the query and injects the query into the wireless sensor network 100 and communicates back to the PDA 106 any data received from the wireless sensor network 100 in response to the query.

In the exemplary embodiment shown in FIG. 1, at least a portion of the nodes in the network 100 are logically arranged into regions 108. A region 108, in such an embodiment, defines a geographic area. Each region 108 is considered to include those nodes that are physically located within the geographic area of that region 108. For example, as shown in FIG. 1, the wireless sensor nodes 102 and the PDA 106 are arranged into four regions 108 (specifically, identified in FIG. 1 as region A, region B, region C, and region D). In such an embodiment, a user or application that retrieves data from the network 100 using the regions 108, if appropriate for the needs of that user or application. In other embodiments, such logical regions 108 are not used.

Figure 2:
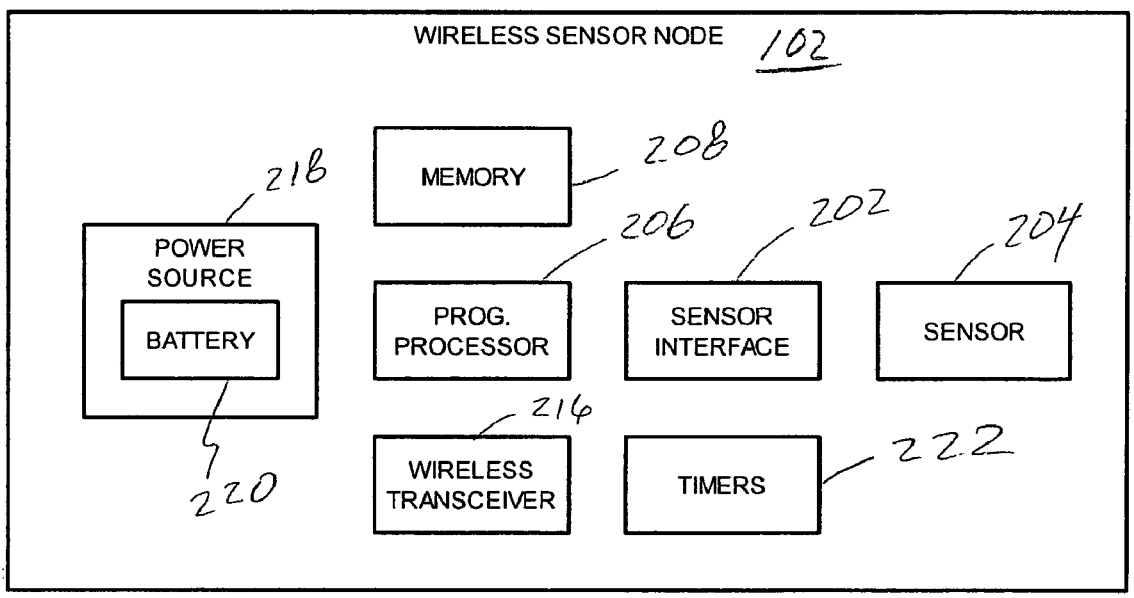
FIG. 2 is a block diagram of one embodiment of a wireless sensor node.

FIG. 2 is a block diagram of one embodiment of a wireless sensor node 102. The wireless sensor node 102 shown in FIG. 2 is suitable for use in the embodiment of a wireless sensor network 100 shown in FIG. 1. The embodiment of a wireless sensor node 102 shown in FIG. 2 comprises a sensor interface 202 that couples a sensor 204 to the wireless sensor node 102. In the particular embodiment shown in FIG. 2, the sensor 204 is integrated into the wireless sensor node 102 (for example, by enclosing the sensor 204 within a housing that encloses the sensor 204 along with the other components of the wireless sensor node 102). In another embodiment, the sensor 204 is not integrated into the wireless sensor node 102 but is otherwise communicatively coupled to the other components of the wireless sensor node 102 via the sensor interface 202.

The sensor 204 is capable of generating a value that, at any given point in time, is indicative of some physical attribute of interest. Examples of sensors 204 include devices that generate a value indicative of temperature, light, magnetic field, air flow, acceleration, vibration, sound, or power. The sensor interface 202 comprises appropriate interface hardware or software for communicatively coupling the sensor 204 to the other components of the wireless sensor node 102. For example, in one embodiment, the software interface 202 includes, for example, an analog-to-digital converter and/or a software driver for the sensor 204.

The wireless sensor node 102 shown in FIG. 2 further comprises a programmable processor 206. The programmable processor 206 is programmed with appropriate program instructions to perform at least a portion of the processing described here as being performed by the wireless sensor node 102. The wireless sensor node 102 shown in FIG. 2 includes memory 208 in which such program instructions and any data structures used by the program instruction are stored. The memory 208 includes any appropriate type of memory now known or later developed including without limitation, read-only memory (ROM), random access memory (RAM), and a set of registers included within the processor 206.

The wireless sensor node 102 shown in FIG. 2 also comprises a wireless transceiver 216 that transmits and receives data over one or more wireless communication links. In one embodiment, the wireless transceiver 216 comprises a RF transceiver that sends and receives data over one or more RF communication links. In other embodiments, the wireless transceiver 216 comprises other types of wireless transceivers for sending and receiving data over other types of wireless communication links (for example, an infrared transceiver for sending and receiving data over infrared communication links) instead of or in addition to an RF transceiver.

The wireless sensor node 102 also comprises a power source 218. In the embodiment shown in FIG. 2, the power source 218 includes a battery 220. In other embodiments, the power source 218 comprises, in addition to or instead of a battery 220, an interface for coupling the wireless sensor node 102 to an external power source such as a source of alternating current (AC) power. The wireless sensor node 102 also comprises one or more hardware timers 222 that are used generating interrupts based on timing-related events.

In one implementation of the embodiment shown in FIG. 2, the wireless sensor node 102 is implemented using a CHIPCON CC1010 integrated circuit that includes an 8-bit microcontroller, 32 kilobytes of flash memory, and 2 kilobytes of RAM.

In the embodiment shown in FIGS. 1 and 2, an event-based data management model is used to implement data management functionality in the wireless sensor network 100. Each of the nodes in the wireless sensor network 100 includes a data management interface 110 that implements at least a portion of such data management functionality. The data management interface 110, in one implementation, comprises software that executes on a programmable processor included in each node.

In such an embodiment, the wireless sensor network 100 is logically viewed as a set of discrete events and a set of logical entities that "generate" the discrete events. The wireless sensor network 100 is queried, in such an embodiment, by specifying a set of events of interest. With such an event-based data management model, a discrete event operator algebra can be used as a formalism to specify the behavior of such a logical system and to verify the correctness and completeness of the specification.

Each event of interest is logically viewed as having a logical entity that is the source of that event. This source entity is also referred to here as the "producer" of that event. Also, each event of interest is logically viewed as having one or more logical entities that are sinks of that event (and/or data related to that event). Each of these sink entities is also referred to here as a "consumer" of that event or event-related data. The data management model used in such an embodiment, in other words, makes use of a "producer/consumer model." For each logical entity, there is a corresponding node in the network 100 that physically implements the processing for that logical entity. The underlying node that implements a given source entity is also referred to here as a "data source" and the underlying node that implements a given sink entity is also referred to here as a "data sink." For example, where an event of interest is a function of sensor data provided by a particular sensor 204, the source entity for that event is implemented on a wireless sensor node 102 that is coupled to that sensor 204 (that is, on the wireless sensor node 102 that is the data source for the desired sensor data). It may be the case, that a particular node in the wireless sensor network 100 implements both the source entity and the sink entity for a given event.

Figure 3:
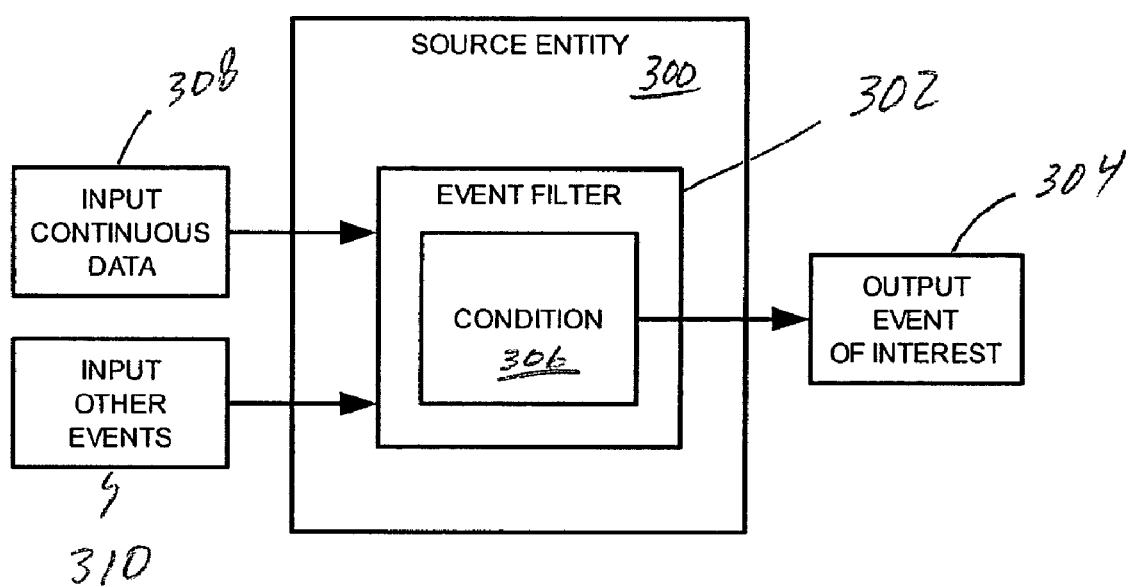
FIG. 3 is a block diagram of one embodiment of a logical source entity that generates an event of interest in a wireless sensor network.

FIG. 3 is a block diagram of one embodiment of a logical source entity 300 that generates an event of interest 302 in a wireless sensor network. The source entity 300 makes use of an event filter 304 to identify an occurrence of the event of interest 302 for which the entity 300 is the sink entity. The event filter 302 comprises a condition 306 and, when the condition 306 is true, the event of interest 302 is considered to have occurred. An event filter's condition 306 can be specified as a function of continuous data 308 (for example, sensor data generated by a sensor) and/or other events 310 generated by other entities (for example, an event for which the source entity 300 is also a sink entity).

Figure 4:
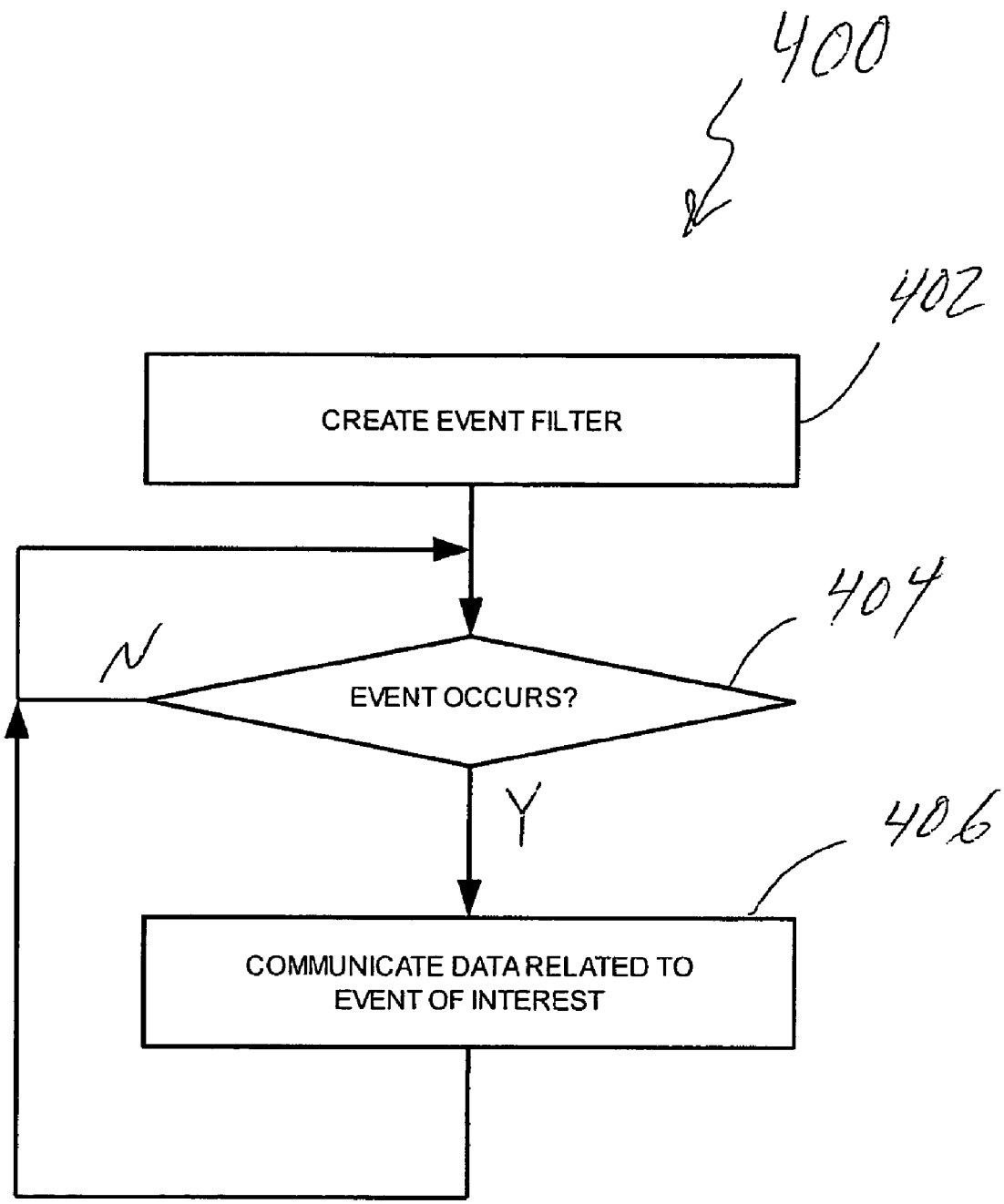
FIG. 4 is a high-level flow diagram of one embodiment of a method of generating an event of interest using the source entity of FIG. 3.

FIG. 4 is a high-level flow diagram of one embodiment of a method 400 of generating an event of interest using the source entity of FIG. 3. Method 400 is used to generate each of a set of events of interest specified in a query that is received at the wireless sensor network 100. A user or application that desires to retrieve information from the wireless sensor network 100 formulates the query and injects the query into the network 100. The query specifies a set of events of interest about which the user or application wishes to receive information. In one embodiment, the query is converted into a form suitable for communication to the nodes in the wireless sensor network 100. In one implementation (for example, as described below in connection with FIGS. 9-15), the query is converted into a binary form of the query that is executed by one or more nodes. When a node receives the query information, the node determines whether that node is able to serve as a source entity for any of the set of events of interest specified in the query. If that node is able to serve as a source entity for an event of interest specified in the query, that node performs the processing of method 400 for that event.

For a particular event of interest specified in a query, an event filter is created at the source entity for that event (block 402). The query includes information that is used by the source entity to create the event filter for that event. For example, in one embodiment, the query specifies a condition, for each event of interest set forth in the query, that is used to identify each occurrence of that event. Once created, the event filter is used to identify when the particular event of interest has occurred. When the event filter determines that the particular event of interest has occurred (block 404), the source node communicates data related to that event to the sink entity specified for that event (block 406). That is, the physical node on which the source entity is implemented communicates the event-related data to the physical node on which the sink entity is implemented over one or more wireless communication links provided in the wireless sensor network 100.

The event-based data management model, in one such embodiment, makes use of a combined producer/consumer and publish/subscribe model. In such a model, from a logical point of view, a sink entity that wishes to receive data related to a particular event informs the wireless sensor network 100 of that entity's interest in that event. The sink entity's interest in that event is then communicated to an entity that is able to serve as a source entity for that event. The sink entity indicates that it is interested in a particular event of interest by "subscribing" to that event. A subscription is formulated and is communicated to a source entity for the event of interest. The subscription identifies the event of interest (for example, by specifying a condition for use in an event filter that identifies that event) and the sink entity to which data related to the event should be sent when the event occurs. The source entity receives the subscription and creates an event filter for that event. The source entity "publishes" the event of interest when the event occurs. That is, when the event of interest specified in the subscription occurs, the source entity sends data related to that event to the specified sink entity. In this way, the nodes in the wireless sensor network 100 only monitor (and process and communicate data about) those events that are of interest to some entity in the network 100 (that is, those events to which a sink entity has subscribed).

In such an embodiment, each subscription is installed at the physical node that implements the logical source entity for the event specified by that subscription. Each subscription can be installed, deferred, paused, resumed, dropped or updated (for example, by a user or application) at anytime during the lifetime of the query. Each subscription has a specified activation time when the source entity is to begin checking for and publishing occurrences of the event of interest. Each subscription, in such an embodiment, also has as a specified lifetime after which the subscription ceases to exist (that is, the source entity no longer checks for and publishes the event of interest). Also, in such an embodiment, each subscription can specify how often the event filter should be evaluated in order to check for occurrences of the event of interest (also referred to here as the "event rate").

Figure 5:
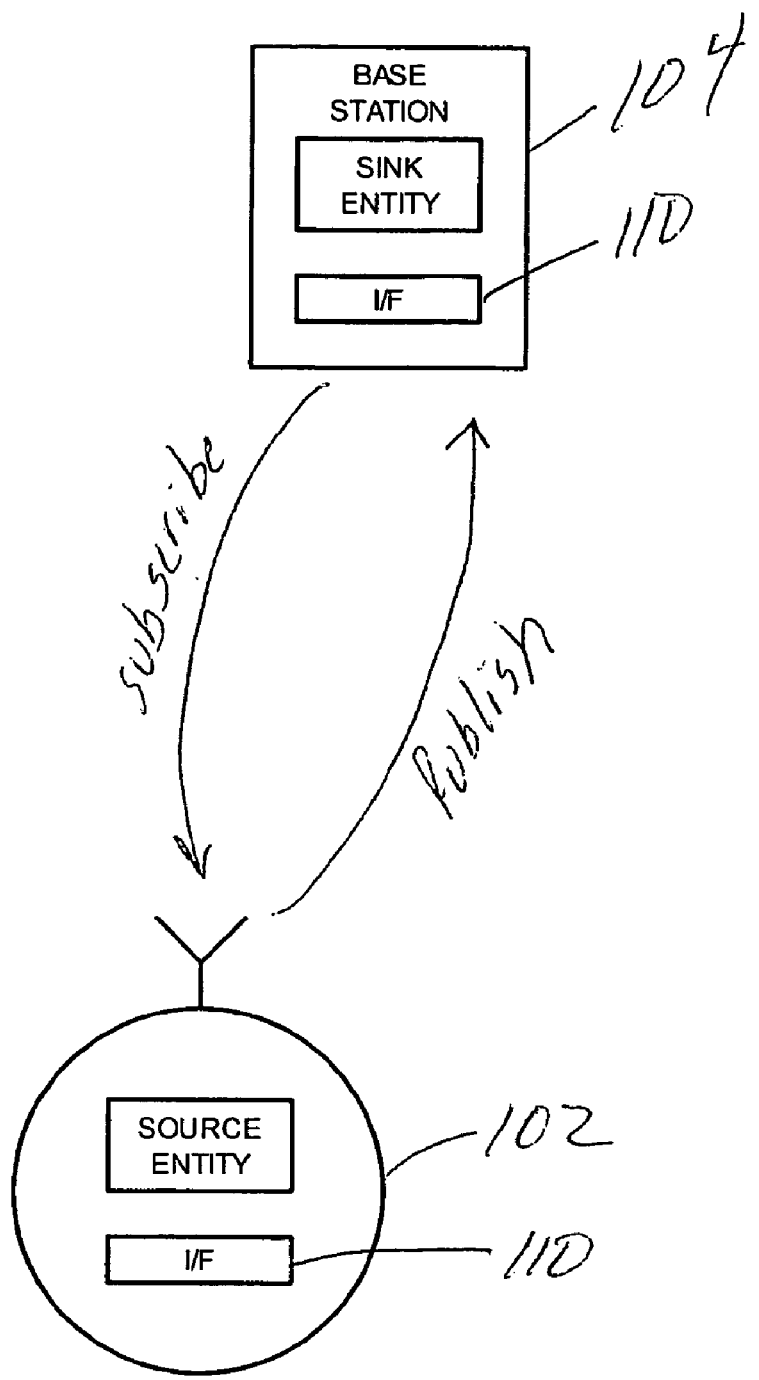
FIG. 5 illustrates one example of a subscription request in the wireless sensor network of FIG. 1.

FIG. 5 illustrates one example of a subscription request in the wireless sensor network 100. In this example, a sink entity wishes to receive information about an event that is associated with a particular sensor. The sink entity is implemented on the base station node 104 and the source entity is implemented on the wireless sensor node 102 that includes the sensor that the sink entity is interested in. The data management interface 110 on the base station 104 communicates the subscription request to the wireless sensor node 102 on which the source entity is implemented (also referred to here as the "source wireless sensor node 102"). In communicating the request to the wireless sensor node 102, the data management interface 110 of the base station 104 interacts with appropriate underlying layers of the networking stack to route the subscription request to the wireless sensor node 102.

When the source wireless sensor node 102 receives the subscription request, the source wireless sensor node 102 installs the event filter associated with that subscription request using the event-filter information specified in the subscription request. After the subscription has been activated and during the lifetime of the subscription, when the source wireless sensor node 102 determines that the event of interest has occurred, the source wireless sensor node 102 publishes the event to the sink entity implemented on the base station 104. In publishing the event, the data management interface 110 on the source wireless sensor node 102 interacts with appropriate underlying layers of the networking stack to route data related to the event that occurred to the base station 104.

In such an embodiment, a subscription can be formulated by a user of the wireless sensor network 100 as a query. The user formulates the query in a formal and verifiable query language. The query language is implemented as a high-level, human-readable language, which provides an interface to access data that resides in the wireless sensor network 100 and provides an interface to specify the intent of the user for the data. The user, in such an implementation, supplies the query, specified in the query language, to a node in the wireless sensor network 100 (for example, the base station 104 or the PDA 106). The node that receives such a query parses the query, checks the query for any syntactic or semantic errors and converts the query into a set of subscriptions. The conversion of the human-readable query (also referred to here as the "source" form of the query) into a set of subscriptions is also referred to here as "compiling" the query. In one embodiment, the set of subscriptions is expressed in a binary form that is designed for convenient execution by the nodes in the wireless sensor network 100. In one implementation of such an embodiment, the data management interface 110 of the node that receives the query parses, checks, and compiles the received query and injects the query into the wireless sensor network 100.

In such an embodiment, subscriptions can also be formulated by an application that resides in or interacts with the wireless sensor network 100. For example, in one implementation, the application formulates the subscriptions in source form using the high-level query language. In another implementation, the application formulates the subscriptions directly in binary form (thereby avoiding the need to compile the query).

In such an embodiment, an optimization process that operates on the source form of the query and/or an optimization process that operates on the binary form of the query can be performed. Examples of various optimizations that can be performed in such an implementation are described below.

In such an embodiment, recursive subscriptions are supported. Each subscription comprises a condition that identifies when the event of interest has occurred. The event of interest associated with the subscription can be a "simple" event that is not expressed in terms of any other events in the wireless sensor network 100 (for example, where the event is a function of continuous data from a sensor or a timer). That is, a simple event comprises a condition that is not a function of any other event in the wireless sensor network 100. Alternatively, the event of interest associated with a particular subscription can be a "complex" or "parent" event that is expressed in terms of one or more other events (also referred to here as "child events") in the wireless sensor network 100. That is, such a parent event comprises a "parent" condition that is a function of one or more child events. Likewise, each child event can itself be a simple event or a parent event that is expressed in terms of one or more child events.

The parent condition for such a parent event can combine the condition for a child event (referred to here as a "child condition") with child conditions for zero, one, or more other child events and/or with zero, one, or more time-based conditions that specify when an event should be published, specify a duration for the subscription, specify an event-rate for the subscription, and/or specify when the subscription should be activated. These child conditions and/or time-based conditions can be combined together, for example, using logical operators (such as AND, OR, or XOR). In one implementation of such an embodiment, the time-based conditions are also implemented as events.

Figure 6:
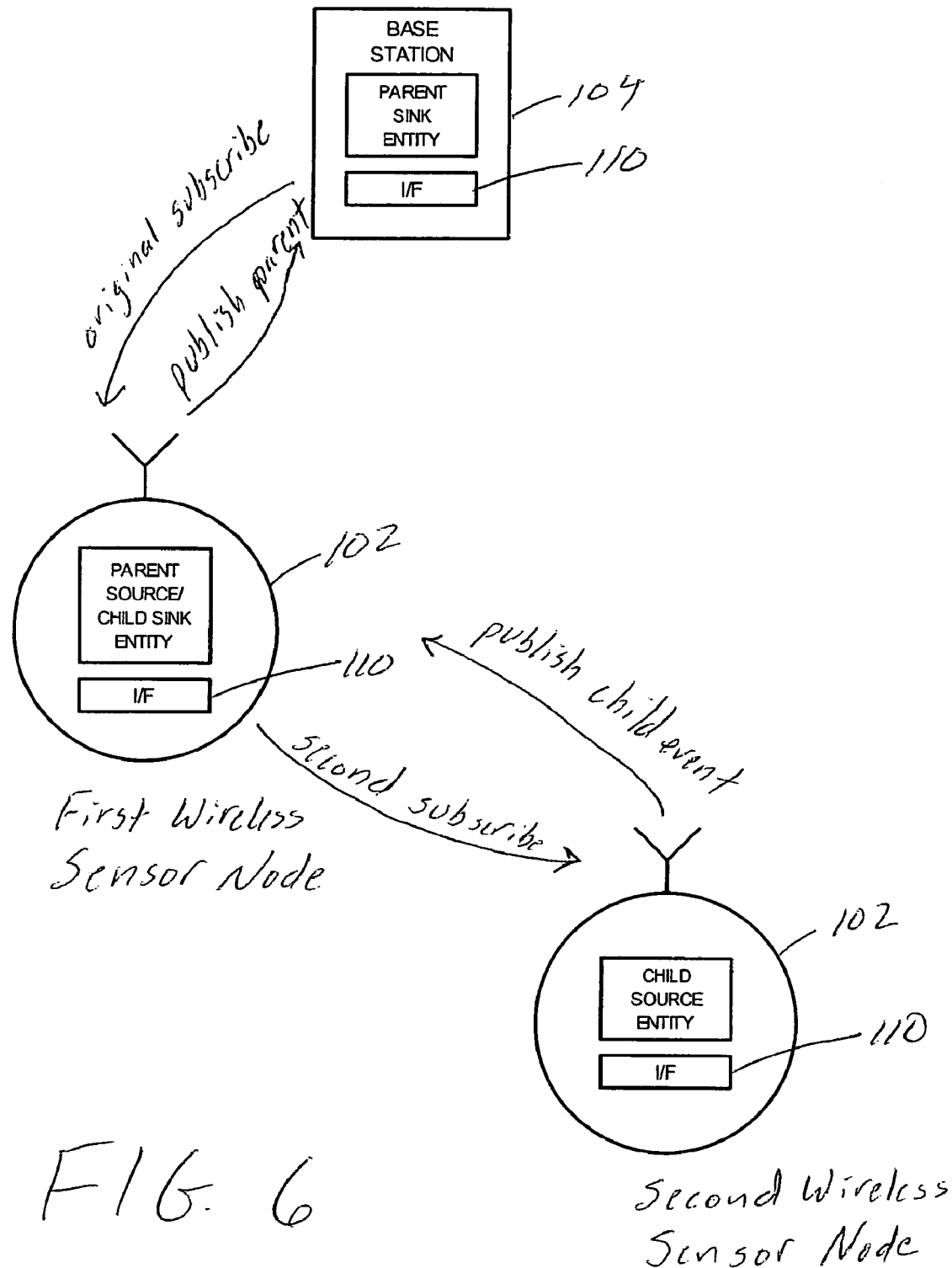
FIG. 6 illustrates, generally, one example of a recursive subscription request in the wireless sensor network.

FIG. 6 illustrates, generally, one example of a recursive subscription request in the wireless sensor network 100. In this example, a recursive subscription indicates that an entity (referred to here as the "parent sink entity") wishes to receive information about an event that is associated with a first sensor when data from a second sensor meets a certain condition. In this example, the recursive subscription comprises a parent event that has a condition that indicates that the value of the first sensor is to be published when the value of the second sensor is greater than 20. In this example, the parent sink entity is implemented on the base station 104 and the source entity (also referred to here as the "parent source entity") is implemented on the wireless sensor node 102 that includes the first sensor. This wireless sensor node 102 is also referred to here as the "first" wireless sensor node 102. The data management interface 110 on the base station 104 communicates the original subscription request to the first wireless sensor node 102, which install an event filter based on the condition specified in the original subscription request.

The parent source entity also "splices" the original subscription request in order to generate a second subscription, based on the original subscription received from the parent sink entity. The second subscription indicates that the parent source entity wishes to be informed as to when the second sensor is greater than 20. In other words, this second subscription identifies a child event that is of interest to the parent source entity.

For this second subscription, the parent source entity is the sink entity. The source entity (also referred to here as the "child source entity") for this child event is the wireless sensor node 102 that includes the second sensor (also referred to here as the "second" wireless sensor node 102). The data management interface 110 of the first wireless sensor node 102 communicates the second subscription request to the second wireless sensor node 102, which installs an event filter based on the condition specified in the second subscription request.

When the second wireless sensor node 102 determines that the child event has occurred (that is, the value of the second sensor is greater than 20), the second wireless sensor node 102 publishes the child event to the child sink entity, which is implemented on the first wireless sensor node 102. In this example, the child sink entity is also the parent source entity. When the parent source entity on the first wireless sensor node 102 learns that the value of the second sensor node is greater than 20, the first wireless sensor node 102 publishes the parent event to the parent sink entity, which is implemented on the base station 104. That is, the first wireless sensor node 102 provides the value of the first sensor to the parent sink entity implemented on the base station 104.

Figure 7:
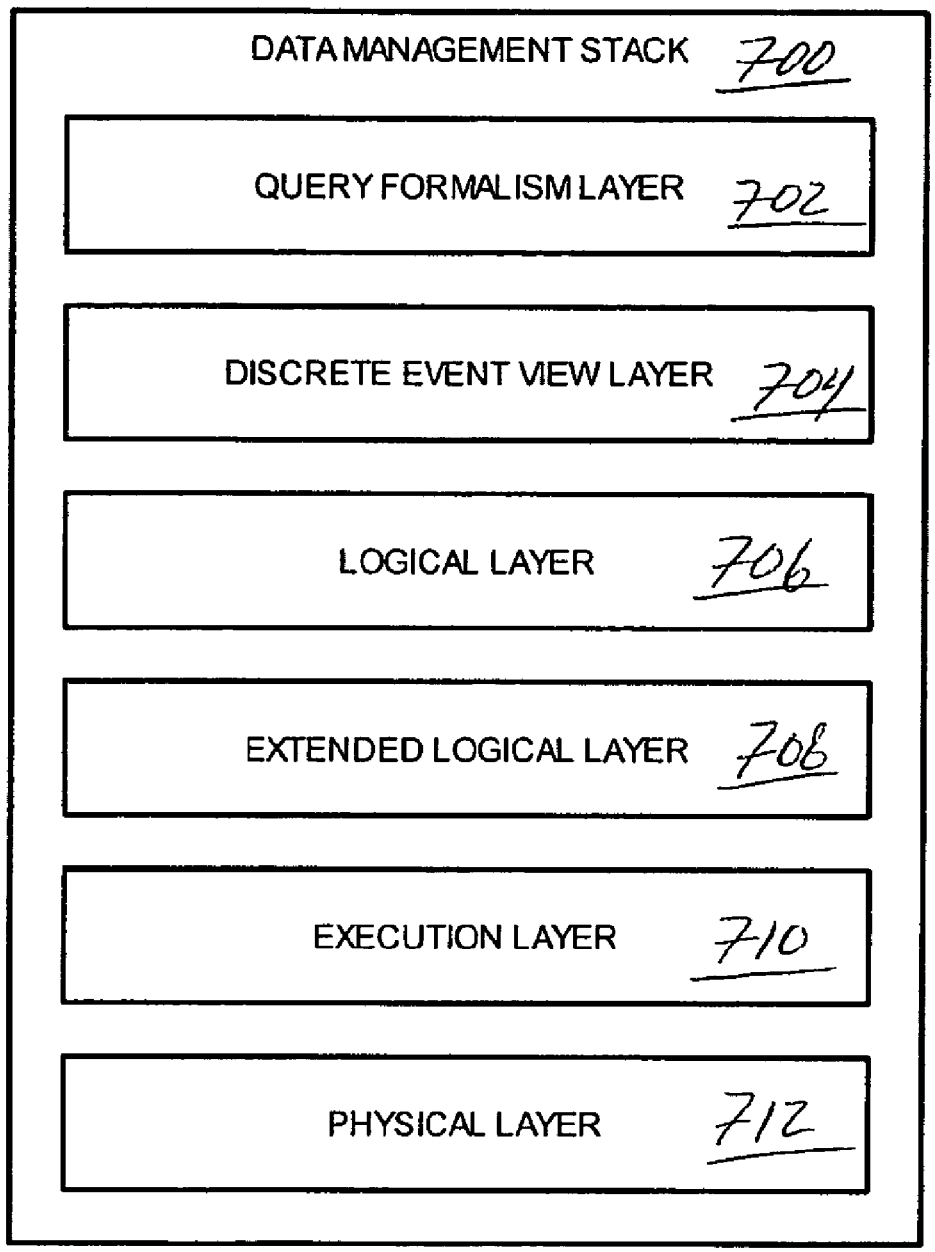
FIG. 7 is block diagram of one embodiment of a data management stack for providing data management functionality in a wireless sensor network.

FIG. 7 is block diagram of one embodiment of a data management stack 700 for providing data management functionality in a wireless sensor network. The embodiment of the data management stack 700 shown in FIG. 7 is described here as being implemented using the wireless sensor network 100 and the wireless sensor node 102 of FIGS. 1 and 2, respectively. Other embodiments are implemented in other ways. One or more of the various layers described here are implemented on each node in the wireless sensor network 100.

In the embodiment shown in FIG. 7, the data management stack 700 comprises six layers. The data management stack 700 includes a query formalism layer 702 that provides the formal framework and language used for querying data from the wireless sensor network 100. For example, the query formalism layer 702 provides the functionality for compiling the source form of a query into a binary form and for injecting the query into the wireless sensor network 100. In such an embodiment, the query formalism layer 702 implements one or more of the following features:

the ability to subscribe for an event.
the ability to publish events to all subscribers.
the ability to uniquely identify each subscription that is made.
the ability to uniquely identify each event and the subscription that generates that event.
the ability to install a subscription, defer installation of a subscription, pause a subscription, resume a subscription, drop a subscription, update or modify a subscription, and activate a subscription.
the ability to specify a lifetime for a subscription.
the ability to specify an activation time for a subscription.
the ability to specify aggregation operations for a subscription, including a singe-source aggregation operation or a multiple-source aggregation.
the ability to specify a subscription that executes only once (that is, only one event is published for that subscription).
the ability to specify a priority for a subscription.
the ability to specify a subscription to one or more simple data sources and/or one or more complex data sources.
the ability to specify a condition used in an event filter for a subscription.
the ability to specify one or more parameter for a subscription.
the ability to specify one or more parameter for a publication.
the ability to specify during initialization a classification of a data source as a producer or a consumer of a particular item of data.
the ability to specify constraints on each subscription and corresponding publications for that subscription, such as a minimum power at a node to install that subscription at that node, a minimum power to generate lower power publication, and a minimum amount of time that a value should be stable before publishing any event that is based on that value.

A Backus-Naur Form (BNF) of one example of a high-level query language that implements these features is shown in FIG. 8.

A description of various statements and clauses shown in FIG. 8 is given below.

SUBSCRIBE EVENT Statement: This statement is used to specify a subscription request. A subscription request is set by an entity when an event of interest is to be monitored.

OF Clause: The OF clause is a part of a SUBSCRIBE EVENT statement that is used to associate a parameter with a region 108 of the wireless sensor network 100.

ACTIVATE Clause: The ACTIVATE clause is a part of a SUBSCRIBE EVENT statement that enables specification of the time when the subscription should be activated by the source entity. If the ACTIVATE clause is not specified the default value of IMMEDIATE (explained below) is used for activation of the subscription. The time parameter for this clause is specified in HH:MM:SS format.

IMMEDIATE Clause: The IMMEDIATE clause is an optional clause of a SUBSCRIBE EVENT statement. When used, this clause specifies that the subscription should be activated immediately (that is, without any delays).

WHEN Clause: The WHEN clause is an optional clause of a SUBSCRIBE EVENT statement. This clause is used to specify a condition for an event filter that is evaluated to identify when the event of interest occurs. The event of interest is published only when the condition is evaluated and found to be true.

LIFETIME Clause: The LIFETIME clause is an optional clause of a SUBSCRIBE EVENT statement. When specified, this clause defines a duration for which the SUBSCRIBE EVENT statement is to be kept alive at the node where the subscription is installed. After the duration specified in this clause has elapsed, this subscription is "removed" from that node. The time parameter for this clause is specified in HH:MM:SS format.

INFINITE Clause: The INFINITE clause is an optional clause of a SUBSCRIBE EVENT statement. When used, it must be used along with a LIFETIME clause in the SUBSCRIBE EVENT statement. This clause defines the lifetime of that subscription as infinite, which means that the subscription will be active while the node at which the subscription is installed remains alive.

ONCE Clause: The ONCE clause is an optional clause of a SUBSCRIBE EVENT statement. When specified, this clause should be specified along with a LIFETIME clause. When this clause is specified with the LIFETIME clause, the subscription is evaluated only once and then removed from the node at which the subscription is installed. This is the default value used if a LIFETIME clause is not specified in the SUBSCRIBE EVENT statement.

PUBLISH EVENT Statement: The PUBLISH EVENT statement is used to publish an event of interest that has been subscribed to in a corresponding SUBSCRIBE EVENT statement. A PUBLISH EVENT statement is generated by a source entity and communicated to one or more sink entities specified in a corresponding SUBSCRIBE EVENT statement when the conditions specified in the SUBSCRIBE EVENT statement are evaluated and are true.

VALUES Clause: The VALUES clause is used in a PUBLISH EVENT statement to communicate the current values of one or more parameters. This clause associates a current value for a parameter with a parameter identifier for that parameter.

INSTALL EVENT Statement: The INSTALL EVENT statement is used to install an event filter at a particular node on which a source entity is implemented for a particular subscription. The event filter is, for example, installed into the program memory of that node and prepared for evaluation by that node. The subscription to be installed is specified by the event-id parameter of the INSTALL EVENT statement.

UNINSTALL EVENT Statement: The UNINSTALL EVENT statement is used to remove a subscription from the wireless sensor network 100. This statement causes the event specified by an event identifier to no longer be checked for by the node on which the corresponding subscription has been installed. The subscription is cached for a limited period of time after being uninstalled for use in optimization processing.

SUSPEND EVENT Statement: The SUSPEND EVENT statement is used to suspend a subscription. The subscription is specified using an event identifier and the state of the subscription is set as "suspended."

DROP EVENT Statement: The DROP EVENT statement is used to remove a subscription from the wireless sensor network 100. This statement causes the event specified by an event identifier to no longer be checked for by the node on which the corresponding subscription has been installed. Unlike with the UNINSTALL EVENT statement, the subscription is not cached for use in optimization processing.

MODIFY EVENT Statement: The MODIFY EVENT statement is used to modify an existing subscription at runtime.

SET LIFETIME Clause: The SET LIFETIME clause is a part of a MODIFY EVENT statement to modify the lifetime of an existing subscription.

ACTIVATE EVENT Statement: The ACTIVATE EVENT statement is used activate a subscription that has previously been suspended via the SUSPEND EVENT statement. The state of the specified subscription is changed from "suspended" to "active."

DEFER EVENT Statement: The DEFER EVENT Statement is used to defer the evaluation of the specified subscription for the specified duration.

MIN|MAX|AVERAGE|SUM|MEDIAN Clauses: These clauses are used to specify that a particular application-specific aggregation operation should be performed as a part of a subscription. The MIN clause indicates that a minimum value of a group of events should be computed, the MAX clause indicates that a maximum value of a group of events should be computed, the AVERAGE clause indicates that an average value of a group of events should be computed, the SUM clause indicates that a sum of a group of events should be computed, and the MEDIAN clause indicates that a median value of a group of events should be computed.

The data management stack 700, in the embodiment shown in FIG. 7, also comprises a discrete event view (DEV) layer 704. The DEV layer 704, in such an embodiment, is scalable so that the functions performed by the DEV layer 704 can be implemented in high-end systems and low-end systems. For example, the source and sink functionality described below is required in both high-end systems and low-end systems, but is scaled appropriately. In such an embodiment, the DEV layer 704 also decides on the actions to be performed for any constraints that are specified in a query. It may be the case, however, that such constraint decisions cannot, during operation, be evaluated and made in the DEV layer 704 due to limitations of resources and information.

The DEV layer 704 performs a semantic check of each subscription by checking the event-filter condition specified in each subscription to check that valid source and sink entities have been specified. The DEV layer 704, as a part of such processing, checks the validity of any time-based conditions (for example, conditions specifying when the corresponding event should be published, the lifetime of the subscription, an event rate for the subscription, and/or when the subscription should be activated). The DEV layer 704, as a part of such processing, checks the validity of any parameters used in the event-filter condition. In an alternative embodiment, such semantic checking is not performed by the DEV layer 704.

In the embodiment shown in FIG. 7, the DEV layer 704 identifies the logical source entity and one or more logical sink entities for each subscription and for each corresponding publication. The DEV layer 704 determines and keeps track of which physical node in the wireless sensor node 100 implements each such logical entity and buffers data for these logical entities so as to provide an interface for users and applications to interact with the logical entities. The DEV layer 704, in such an embodiment, also handle recursive subscriptions and the corresponding publications. For example, the DEV layer 704 maps each publication generated by a source entity to the corresponding subscription so that the "chain" specified in a recursive subscription can be maintained.

In the embodiment shown in FIG. 7, the DEV layer 704 maintains information about the subscriptions that exist in the wireless sensor network 100 at any given point in time. Such information is used by the DEV layer 704 to optimize, at least partially, new queries and/or existing queries. In one embodiment, the optimization processing performed by the DEV layer 704 includes optimizing recursive subscriptions that are received by the wireless sensor network 100. Such optimization processing is also referred to here as "recursive-subscription optimization." The DEV layer 704, when a recursive subscription is received, recursively converts the original, recursive subscription into a set of smaller and more efficient subscriptions. The DEV layer 704 also maintains the proper linkage of the set of subscriptions to main the logical relationship specified in the original, recursive subscription.

In one embodiment, the optimization processing performed by the DEV layer 704 includes processing that is based on, that alters, or that otherwise takes into account the organization of the logical entities in the wireless sensor network 100. Such optimization processing is also referred to here as "data-source organization optimization" or "data-source optimization." As noted above, logically, the wireless sensor network 100 can be viewed as a set of entities, each of which is able to send and/or receive data related discrete events of interest. In the embodiment shown in FIG. 1, the entities are organized geographically into regions 108. A region 108 is an abstract entity that has an associated geographical area defined by a user of the network 100. Each region 108 is considered to include all the logical entities that are implemented on a physical node that is physically located within the geographical area associated with that region 108. The DEV layer 704 can optimize a query using heuristics that are based on the organization of the logical entities involved in the query. For example, such heuristics can be based on the physical distance between nodes used to implement logical entities involved in a given query.

In one embodiment, the optimization processing performed by the DEV layer 704 includes processing that is based on or that optimizes the use of available resources in the wireless sensor network 100 (for example, based on the availability of memory, power, and network bandwidth). Such optimization processing is also referred to here as "resource-influenced optimization."

In one embodiment, optimization processing performed by the DEV layer 704 includes processing that is based on or that alters the status of one or more subscriptions. Such optimization processing is also referred to here as "subscription-status influenced optimization" or "subscription-status optimization." As noted above, at any given point in time, many subscriptions typically exist in the wireless sensor network 100. Each subscription that exists in the wireless sensor network 100 has a current state, such as "active," "suspended," or "uninstalled." Optimization processing performed by the DEV layer 704 includes, for example, changing the state of a subscription in order to optimize some attribute of the network 100 (for example, network bandwidth used by the node on which a subscription is implemented). In one implementation of such an embodiment, a finite state machine representation of the status of each subscription is used in the DEV layer 704, among other things, to perform such subscription-status optimization. Examples of heuristics that can be used in such an embodiment include the following:

if a new subscription is received by the DEV layer 704 that specifies the same event that is specified in an existing subscription but with an extended lifetime, the DEV layer 704 causes the node on which the existing subscription is installed to modify the existing subscription by extending the lifetime of the existing subscription and to publish events to both the sink entity specified in the existing subscription and the sink entity specified in the new subscription.

if a new subscription is received by the DEV layer 704 that is the same as an existing subscription but with a different event rate, the DEV layer 704, if possible, causes the node on which the existing subscription is installed to modify the existing subscription by adjusting the event rate of the existing subscription to satisfy both the existing subscription and the new subscription and to publish events to both the sink entity specified in the existing subscription and the sink entity specified in the new subscription.

if a new subscription is received by the DEV layer 704 that specifies parameters similar to parameters specified in an existing subscription, the DEV layer 704 causes the node on which the existing subscription is installed to copy the existing subscription information and to modify the copy in order to install the new subscription on that node.

if a new subscription is received by the DEV layer 704 that is exactly the same as an existing subscription except for specifying a different sink entity, the DEV layer 704 causes the node on which the existing subscription is installed to publish events to both the sink entity specified in the existing subscription and the sink entity specified in the new subscription.

if a new subscription is received by the DEV layer 704 that specifies a first event generated by a first source entity but a second entity in the network 100 is also able generate a second event that is similar to the first event, the DEV layer 704 is able to install the subscription on the second source entity or modify an existing subscription that is already exists on the second source entity to publish events to the sink entity specified in the new subscription.

when the lifetime of a subscription has elapsed, the node on which that subscription is installed can be instructed to save the subscription (for example, by changing the status of the subscription from "installed" to "uninstalled") for a predetermined period of time after uninstalling the subscription, thereby making the subscription available to the DEV layer 704 (for example, for one or more of the optimizations described above) for an additional period of time.

In one embodiment, optimization processing performed by the DEV layer 704 includes processing that is based on, that alters, or that otherwise takes into account a multi-source aggregation operation specified in a subscription. Such optimization processing is also referred to here as "multi-source aggregation optimization" or "multi-source optimization." In a multi-source aggregation operation, more than one source entity is specified for a subscription and any corresponding publications. An example of such a multi-source aggregation operation is a subscription in which one event generated by a first source entity influences an aggregation event that is generated by a second source entity. Examples of heuristics that can be used in such an embodiment include performing localized data-source optimizations before performing multi-source optimization, performing subscription-status optimization, resource-influenced optimization, or other kinds of optimization processing before performing multi-source optimization, and/or performing event-sequencing optimization so that events from disparate sources are ordered optimally.

In one embodiment, optimization processing performed by the DEV layer 704 includes processing that is based on, that alters, or that otherwise takes into account a single-source aggregation operation specified in a subscription. Such optimization processing is also referred to here as "single-source aggregation optimization" or "single-source optimization." In a single-source aggregation operation, a single source entity is specified for a subscription and any corresponding publications. In such single-source aggregation optimization, information related to the single source entity is used in performing optimization processing. Examples of heuristics that can be used in such optimization processing include implementing the source entity for such an aggregation operation on a physical node that has higher resource availability and/or that results in the lowest (or lower) amount of power being expended to communicate with that physical node.

In one embodiment, optimization processing performed by the DEV layer 704 includes processing that is based on, that alters, or that otherwise takes into account the ordering of subscriptions and/or publications (for example, within a given subscription, region, and/or the network 100 as a whole). Such optimization processing is also referred to here as "event sequencing optimization." In such optimization processing, dependencies between the various events and parameters are used in finding an optimal (or improved) sequencing of subscriptions and/or publications. In one implementation, a Petri net-based model is maintained in the DEV layer 704 for use in such optimization processing.

In one embodiment, optimization processing performed by the DEV layer 704 includes processing that is based on, that alters, or that otherwise takes into account a "when" clause specified in a subscription. The when clause for a given subscription is used to specify a condition that is used in the event filter for that subscription. Such optimization processing is also referred to here as "when-clause optimization." The when-clause optimization processing breaks down the when clause into unit/atomic conditions that are optimized using the optimization processing described above. In one implementation of such an embodiment, techniques similar to those used in optimizing "where" clauses in structured query language (SQL) queries are used. For example, in one such implementation, a subscription/publication parse tree is assembled from the query and evaluated to find the cost of each condition-expression given in the when clause and appropriate optimizations are performed.

In one embodiment, optimization processing performed by the DEV layer 704 includes processing that is based on, that alters, or that otherwise takes into account one or more constraints specified in a subscription. Constraints are specified for a given subscription in order to specify the boundaries of the subscription. The constraints can be used to eliminate some of the methods or approaches used to manage the subscription and any corresponding publications.

In one embodiment, the DEV layer 704 uses one or more finite state machine models to implement at least a portion of the functionality provided by the DEV layer 704. In such an embodiment, a finite state machine-based model is used to model those aspects of the network 100 that involve specific states and state transitions. Examples of where a finite state machine-based model is used include:

tracking the status of subscriptions; each subscription transitions through one or more of the various states mentioned above (for example, "installed," "active," "suspended," "resumed," and "waiting").

tracking data source dependencies; global dependencies between those entities in the network 100 that wait on other entities in the network 100 for data or events are used to identify those entities at which additional load can be scheduled (for example, because those entities are in a wait state).

tracking the current status of entities in the network; a given entity transitions through various states such as "initialization," "fault," and diagnostics." The states are required during subscription scheduling optimization. For example, when an entity is in a "diagnostic" state, operations should not be scheduled on that entity.

tracking the current health status of an entity; the health of an entity can be modeled using states and transitions between the states. For example, the power and memory available at a given entity can be modeled using various states and transitions between those states can be used to represent the health of the entity.

In one embodiment, the DEV layer 704 uses one or more Petri net models to implement at least a portion of the functionality provided by DEV layer 704. In such an embodiment, a Petri net model is used in event scheduling. The events are scheduled based on dependencies that exist between the events. The tokens of the Petri net are used to schedule and sequence the various subscriptions and publications that exist in the wireless sensor network 100.

In the embodiment shown in FIG. 7, the data management stack 700 further comprises a logical layer 706. The logical layer 706 implements an abstract view of the data in the wireless sensor network 100 using the event-based data model described above in connection with FIGS. 3 through 6 in which the wireless sensor network 100 is logically viewed as a set of logical entities that generate discrete events. Such an event-based data model makes use of a producer/consumer model in which a given entity can be classified as a consumer of certain data and a producer of other data. The use of the producer/consumer model, among other things, supports sensing, actuation, and control in sensor network 100. The event-based data model also makes use of a publish/subscribe model so that the nodes in the wireless sensor network 100 only monitor (and process and communicate data about) those events that are of interest to some entity in the network 100.

The data management stack 700, in the embodiment shown in FIG. 7, also comprises an extended logical layer 708 in which application scenario-specific extensions to the logical layer 706 are made. In one implementation, the extended logical layer 708 includes extensions that maintain information related to event dependencies, data dependencies (for example, dependencies between events that are generated by various data sources), aggregation dependencies, replication dependencies, control dependencies (for example, dependencies that exist between various data sources for performing a control operation), actuation dependencies, and availability management (for example, information pertaining to availability of data to indicates, for example, that data should be stored in an intermediary data source for ensuring a desired level of data availability). In one implementation, the extended logical layer 708 is implemented at the base station 104 and at each data source in the network 100.

The data management stack 700, in the embodiment shown in FIG. 7, also comprises an execution layer 710. The execution layer 710 provides an abstract view and snap-shot, both static and dynamic, of the execution state of the wireless sensor network 100. The execution layer 710 maintains information pertaining to aggregation points in the network 100, adaptive query operations, query execution points, and replication points. The information maintained by the execution layer 710 is updated in response to every occurrence of an event of interest (that is, every event that is subscribed to) in the network 100.

The data management stack 700, in the embodiment shown in FIG. 7, also comprises a physical layer 712 in which network-specific dependencies are managed. The topology, routing and base-band issues are managed by the physical layer 712. The execution layer 710 interacts with and uses the services provided by the physical layer 712 to publish events, identify aggregation points and optimize data management functionality.

As noted above, an event-based formalism is used for data management in the wireless sensor network 100. The formalism includes the grammar used for specifying the subscriptions and resulting publications of data from the sensor network. In one embodiment, the event-based formalism is extended to include a set of operators (also referred to here as "discrete event operators") that are used for forming an execution plan that can be subjected to analysis and optimization using the properties of the operators. The discrete event operators are defined from an algebraic formalism. This algebraic formalism is also referred to here as a "discrete event process algebra." The discrete event operators in this algebra are extended and modified appropriately for execution plan creation.

The discrete event process algebra is used by the data management stack 700 of the wireless sensor network 100 to formulate "processes" for use in the execution planning phase performed by the query formalism layer 700. The following describes one embodiment of a discrete event process algebra. In this embodiment, a "trajectory" is defined as the sequence of events that are accepted and processed by a given process until termination of that process. The symbol "$\epsilon$" is defined as the string whose symbols are the events from the event set. The symbol "$\Sigma$" is defined as the set of all the events that are applicable for a process, including both the events that are accepted and rejected by the process. The symbol "Xi" is defined as the string of events that are rejected by a process before an event is successfully accepted by the process. The symbol "$\sigma i$" is defined as the event that is accepted by a process. The symbol "$\Sigma ext$" is defined as the event set $\Sigma$ that is extended with events Termination, Divergence, Positive Response and Feedback Response.

In one embodiment, any decision point along the wireless sensor network 100 is defined as a process. Formally, a process P in the wireless sensor network 100 is a subset $P \subseteq O_{td}$ := $(2\exp(\Sigma_{ext}) \times \Sigma)^* \times 2\exp(\Sigma_{ext})$ satisfying the following conditions:

Condition 1: $(\epsilon, \Phi) \in P$; Null trajectory is in every process. This is the idle state of the process.

Condition 2: $((X_0, \sigma_1)(X_1, \sigma_2) \ldots (X_{k1}-, \sigma_k), X_k) \in P$ & $\exists j$: $0 \leq j \leq k-1$; $\sigma_{j+1} \in X_j \Rightarrow ((X_0, \sigma_1) \ldots (X_{j-1}, \sigma_j), X_j \cup \{\Uparrow\}) \in P$; All trajectories of a non-divergent process must be valid.

Condition 3: Termination symbol ($\Downarrow$) is a standalone symbol.

Condition 4: A process terminates with the termination event ($\Downarrow$) and accepts no further events.

Condition 5: A process generates event ($\wedge$) in response a set of accepted events.

In such an embodiment of a discrete event process algebra, an event set $\Sigma$ is augmented using $\wedge$ and $\setminus$ symbols. In such an embodiment, the following discrete event operators are defined:

(a) Prefix Operator (->.): The prefix operator in the data management stack 700 is used for sequencing the operations in the wireless sensor network 100. The prefix operator Q:=$\sigma$->P specifies that the process Q starts at an initial state and then moves to (transitions to) process P on event $\sigma$. An example of use of prefix operator is the ACTIVATE clause of the data model (describe above in FIG. 8). One example of a subscription that includes this operator is:

SUBSCRIBE EVENT ('124', '125', '126') OF '902' WHEN ('512' OF '345'>'903' OF '567') ACTIVATE '10:32:12" LIFETIME '12:30:00' EVERY '00:00;10';

In this example, P and Q are defined as:
Q=Idle process $\Delta$ that is waiting for an event.
P=('512' OF '345'>'903' OF '567')
$\sigma$=Timer event '10:32:12'
$\Delta$:="10:32:12" --------------------- ('512' OF '345'>'903' OF '567')

(b) Controlled Alternative Operator (+): This operator enables transition to two different processes that depend on two different and mutually exclusive events. Given Q1=$\sigma$1->P1 and Q2=$\sigma$2->P2 the operator+enables transition from the start state of process Q to either P1 or P2 depending upon either the $\sigma$1 or $\sigma$2 event respectively. Q=($\sigma$1+P1)+($\sigma$2+P2). One example of a subscription that includes this operator is:

SUBSCRIBE EVENT ('124') OF '902' WHEN (('512' OF '345'>50 AND '602' OF '831'>70) OR ('602' OF '831'<20 AND '129' OF '513'<90)) ACTIVATE IMMEDIATE;

In this example, P1, P2, $\sigma$1, $\sigma$2, and Q are defined as follows:
P1=('512' OF '345'>50 AND '602' OF '831'>70)
P2=('602' OF '831'<20 AND '129' OF '513'<90)
$\sigma$1=('602' OF '831'>70)
$\sigma$2=('602' OF '831'<20)
Q=$\Delta$ (which is referred to here as the "idle process") and is defined as:
$\Delta$=(('602' OF '831'>70)->('512' OF '345'>50 AND '602' OF '831'>70)+(('602' OF '831'<20)->('602'OF '831'<20 AND '129' OF '513'<90))

(c) Uncontrolled Alternative Operator ($\oplus$): This operator is not used in this embodiment of a discrete event process algebra, as the wireless sensor network 100 in this embodiment is deterministic and no non-deterministic operators are possible.

(d) Event-Internalization (\\$\sigma$): This operator is used to remove the occurrences of a given event from external view. Given P=(a->b->$\Delta$)+(c->$\Delta$), P\a is given by (b->$\Delta$)+(c->$\Delta$). An example of one application of this operator is during the LIFETIME and EVERY clauses of the grammar defined in FIG. 8. The event for LIFETIME clause is internalized with that of EVERY clause so that LIFETIME events are made 'invisible' from the external view.

(e) Parallel Composition without Sync. (.||$\Phi$.): This operator enables two processes to operate in parallel completely independent of each other. This operator is used in the data management stack 700 for performing operations that need not be synchronized by timer events. One class of operation for which this operator is applicable is the 'Decomposable aggregation' operation.

(f) Parallel Composition with full Synchronization (.||$\Sigma$.): This operator enforces a rule that all the events in the event set $\Sigma$ be completed and fully synchronized. This operator is used in the data management stack 700 to execute events that are conjoined by the AND logical operator in the WHEN clause of the grammar set forth above in FIG. 8. One example of a query that uses this operator is:

SUBSCRIBE EVENT ('124') OF '902' WHEN ((('512' OF '345'>50 AND '602' OF '831'>70) OR ('602' OF '831'<20 AND '129' OF '513'<90)) ACTIVATE IMMEDIATE;

In this example, the synchronization set is:

$\Sigma 1 = \{('512' \text{ OF } '345'>50), ('602' \text{ OF } '831'>70)\}$
$\Sigma 2 = \{('602' \text{ OF } '831'<20), ('129' \text{ OF } '513'<90)\}$ In this example, the event-sets $\Sigma 1$ and $\Sigma 2$ are synchronized using the ".∥Σ." operator.

(g) Parallel Composition on Synchronization Set (.∥A.): This operator is similar in functionality to the .∥Σ. operator except that $A \subset \Sigma$. This restricted set is applicable in the data management stack 700 when the WHEN clause of a SUBSCRIBE statement contains an OR logical operator A=Σ (AND) event–Σ(OR) events.

(h) Prioritized Synchronization Composition (.A∥B.): The prioritized sets are defined on the processes and synchronization is enforced on these events only. This operator is used in the data management stack 700 to enforce priority on the events of a data source. Only those events that have priority above a certain threshold are included in the priority event sets A and B.

(i) Termination (⇓): A process terminates if after processing a set of events the process refuses any further events. A termination operator is used in the data management stack 700 to denote the completion of the SUBSCRIPTION. A variation of the ⇓ operator is the instance termination operator (↓), which terminates the current instance of SUBSCRIPTION and initializes the subscription for a new execution.

(j) Divergence (⇑): The divergence operator models the catastrophic behavior of the process and it is applicable when the process reaches a chaotic state. In the data management stack 700, this operator is used for modeling the behavior of the wireless sensor network 100 when either the node dies or the node gets disconnected from the network.

(k) Positive Response Operator (/ˆ): This operator generates events from the process in response to the processing function's output. This is a positive response as it contains values that are generated. An example of this kind of operator would be used when values are PUBLISHED from the data source in response to an aggregation operation.

Figure 9:
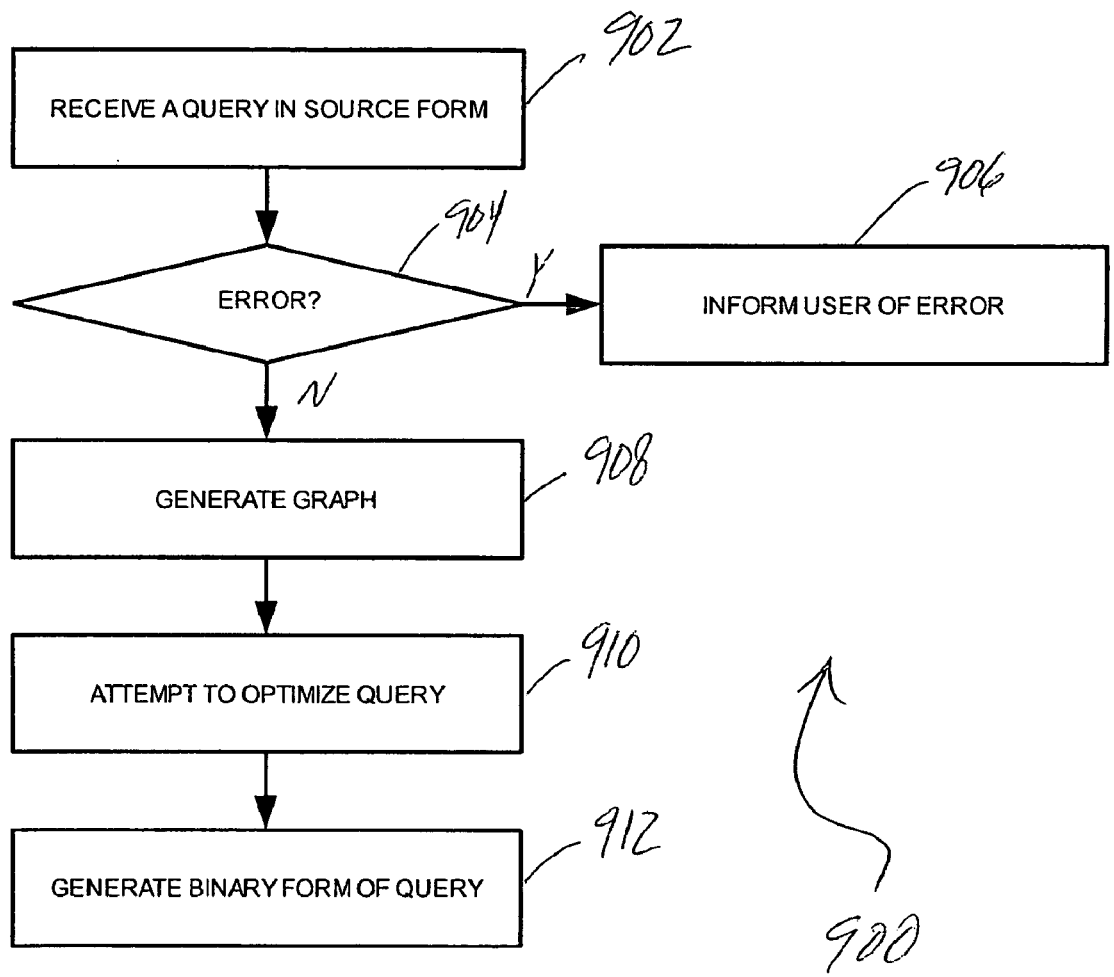
FIG. 9 is a flow diagram of one embodiment of a method of compiling a source form of a query in order to generate the binary form of that query.

(l) Feedback Response Operator (\ˆ): The feedback response operator is used to signal the completion of some task. In the data management stack 700, this operator is used to start the operation of parameter assimilation specified in a SUBSCRIPTION/PUBLICATION list. One example of a subscription query that uses this operator is:

SUBSCRIBE EVENT ('124') OF '902' WHEN ((('512' OF '345'>50 AND '602' OF '831'>70) OR ('602' OF '831'<20 AND '129' OF '513'<90)) ACTIVATE IMMEDIATE;

FIG. 9 is a flow diagram of one embodiment of a method 900 of compiling a source form of a query in order to generate the binary form of that query. The embodiment of method 900 shown in FIG. 9 is described here as being implemented using the wireless sensor network 100, wireless sensor node 102, and data management stack 700 of FIGS. 1, 2, and 7, respectively. Other embodiments are implemented in other ways.

Method 900 includes receiving a query in source form (block 902). For example, in one usage scenario, a user of the wireless sensor network 100 formulates a query using the query language described above in connection with FIG. 8 and inputs (or otherwise communicates) the query to the base station 104. In one implementation, the query formalism layer 702 implements the functionality that receives the query in source form.

The query is checked for syntactic and semantic errors (block 904). If there are any errors, the user is informed of the error (block 906) and processing of the received query is terminated. If there are no errors, a graph is generated from the source form of the query (block 908). The graph that is generated expresses the query in an instruction set that is used in the wireless sensor network 100. The source form of the query is parsed and the corresponding graph is generated based on the contents of the query. Each node in the graph that is generated is associated with a particular instruction from the instruction set. In this embodiment, the instruction set comprises a set of discrete event operators from a discrete event process algebra (also referred to here as "DEO instructions") and a set of operators that are used to define and/or retrieve a value for a simple event (also referred to here as "simple-event instructions"). A discrete event operator instruction is associated with each parent node in the graph (that is, each node that includes one or more child nodes). The discrete event operator instruction defines a relationship (for example, sequencing, ordering and/or synchronization) of the subject defined by and under each child node of that parent node. The DEO instruction associated with each parent node is also referred to here as the "parent instruction" for that parent node. Each child node can itself be a parent node (having an associated DEO instruction and one or more child nodes) or a leaf node. Each leaf node is associated with a single, simple event and a simple-event instruction is associated with each leaf node.

Method 900 further comprises attempting to optimize the query as expressed in the generated graph (block 910). For example, one or more of the optimization techniques described above are performed by the DEV layer 704 of the data management stack 700. A binary form of the query is then generated from the optimized graph (block 912). The graph generated for the query is traversed and the instruction associated with each node is generated, properly populated, and added to the end of the binary form of the query. In this way, the binary form of the query is generated.

Figure 10:
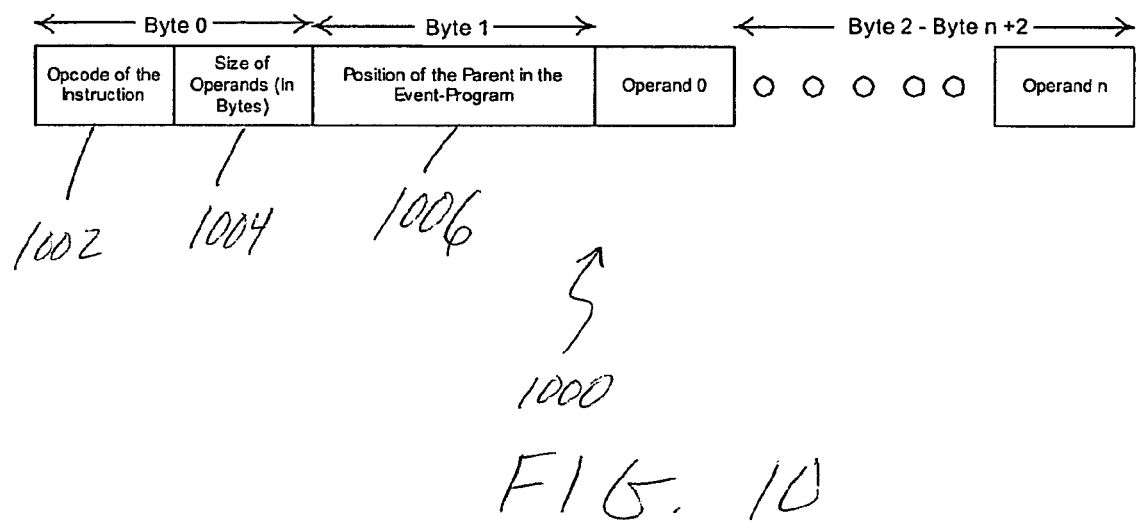
FIG. 10 is a block diagram illustrating one exemplary instruction format for use with the method of FIG. 9.

FIG. 10 is a block diagram illustrating one exemplary instruction format 1000 for use with the embodiment of method 900 shown in FIG. 9. Each instruction includes an operation code (also referred to here as an "opcode") field 1002 that identifies the particular operation for that instruction. Each instruction also includes an operand size field 1004 that contains the total size of the operands (if any) included in that instruction. In the embodiment shown in FIG. 10, the opcode field 1002 and the operand size field 1004 are each 4 bits wide and are located in the first byte of the instruction (labeled "Byte 0" in FIG. 10). Each instruction also includes a parent identifier field 1006 that contains an identifier that identifies the parent instruction for that instruction (which corresponds to a particular parent node in a corresponding graph). The parent identifier field 1006, in the embodiment shown in FIG. 10, is one byte wide and is located in the second byte of the instruction (labeled "Byte 1" in FIG. 10). Each instruction includes none, one, or more operands depending on the particular opcode specified for that instruction. In the embodiment shown in FIG. 10, each operand follows the parent identifier field 1006 in the instruction.

FIG. 11 illustrates one example of an instruction set 1100. The instruction set 1100 includes a set of DEO instructions 1102, each of which corresponds to an operator in the discrete event process algebra described above. The instruction set 1100 also includes a set of simple-event instruction 1104 that are used to define and retrieve a simple event.

FIG. 12 illustrates one example of a query 1200 expressed in source form using the grammar set forth above in FIG. 8. The query 1200 shown in FIG. 12 specifies a subscription request for getting data from a particular region of interest. In the query 1200 shown in FIG. 12, the particular region of interest for the subscription has a region identifier of 99. This subscription subscribes to three events that related to the parameters identified by the parameter identifiers of 124, 125, and 126. For example, in one implementation, these three parameters relate to temperature, airflow and light intensity, respectively. In the query shown in FIG. 12, a lifetime of one minute and thirty seconds is specified for the subscription. The query 1200 specifies that the subscription be activated after five seconds and be evaluated every 30 minutes. Additional conditions are specified for the subscription request in a "WHEN" clause. These additional conditions specify when the parameters of interest should be fetched and published as events at the specified points of time and when the condition specified in the WHEN clause, as a whole, is valid.

Figure 13:
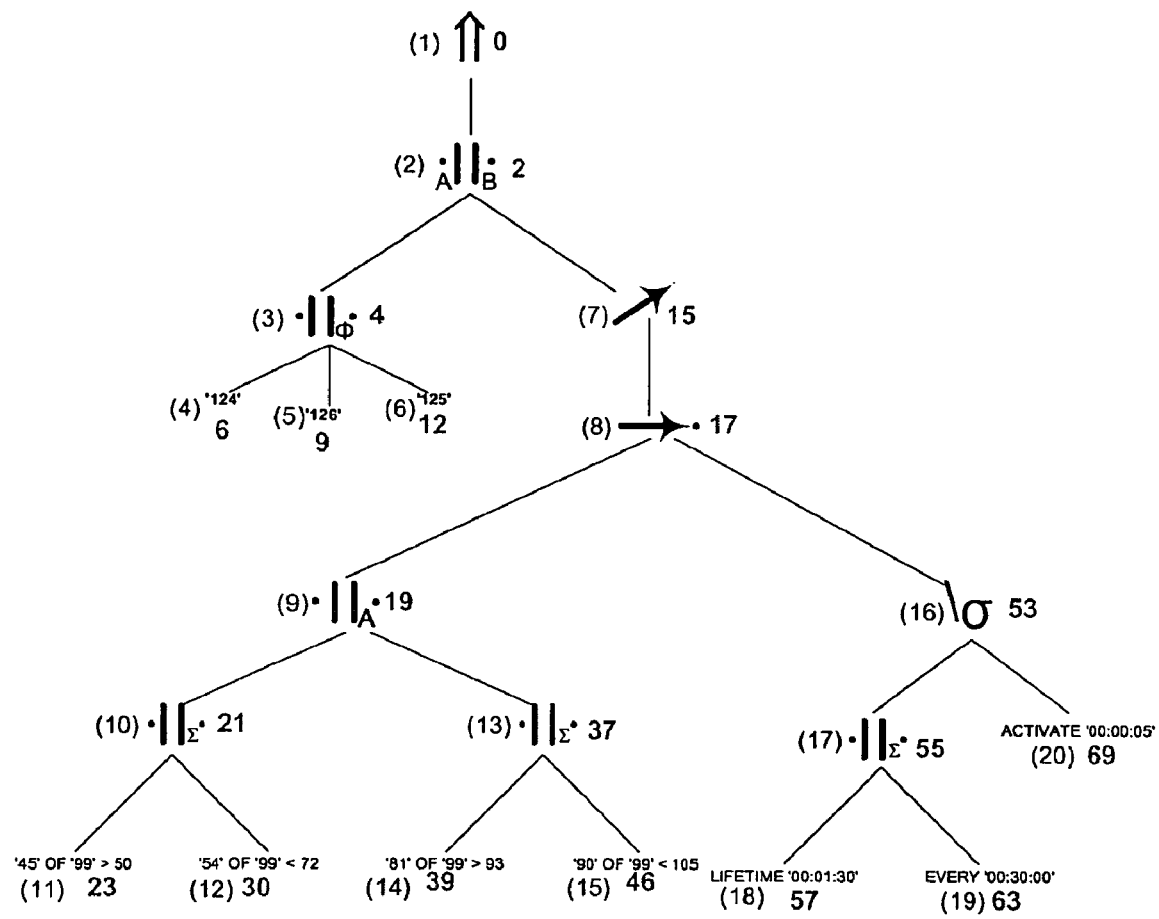
FIG. 13 illustrates a graph generated from the query that is expressed in source form in FIG. 12.

FIG. 13 illustrates a graph 1300 generated from the query 1200 that is expressed in source form in FIG. 12. Each parent node of the graph 1300 is displayed in FIG. 13 using the discrete event process algebra symbol that represents the discrete event operator associated with that parent node. Also, the discrete event operator associated with each parent node can also be viewed as a complex event, each occurrence of which is determined as a function of the child nodes of that parent node. Each leaf node in the graph 1300 is displayed in FIG. 13 using a description of the particular simple event associated with that leaf node. Also, each node of the graph 1300 has an associated index number (referred to here as an "event index"). The event index for each node in the graph 1300 shown in FIG. 13 is set forth in parentheses to the left of that node. Each node is also refereed to here using the event index for that node (for example, the node having an event index of 1 is referred to here as "node 1" or "event 1" and the node having an event index of 2 is referred to here as "node 2" or "event 2"). Each node shown in FIG. 13 also has an associated identifier number (referred to here as an "event identifier") that is set forth to the right of or below that node.

FIG. 14 is a table 1400 having a row for each node in the graph 1300 shown in FIG. 13. The table 1400 also includes a first column that identifies the event index of the node of each row, a second column that identifies the event identifier for each row, a third column that identifies the event index of the parent event for each row, a fourth column that identifies the event identifier for the parent event for each row in decimal form, and a fifth column that sets forth the event identifier of the parent event for each row in hexadecimal form.

Figure 15:
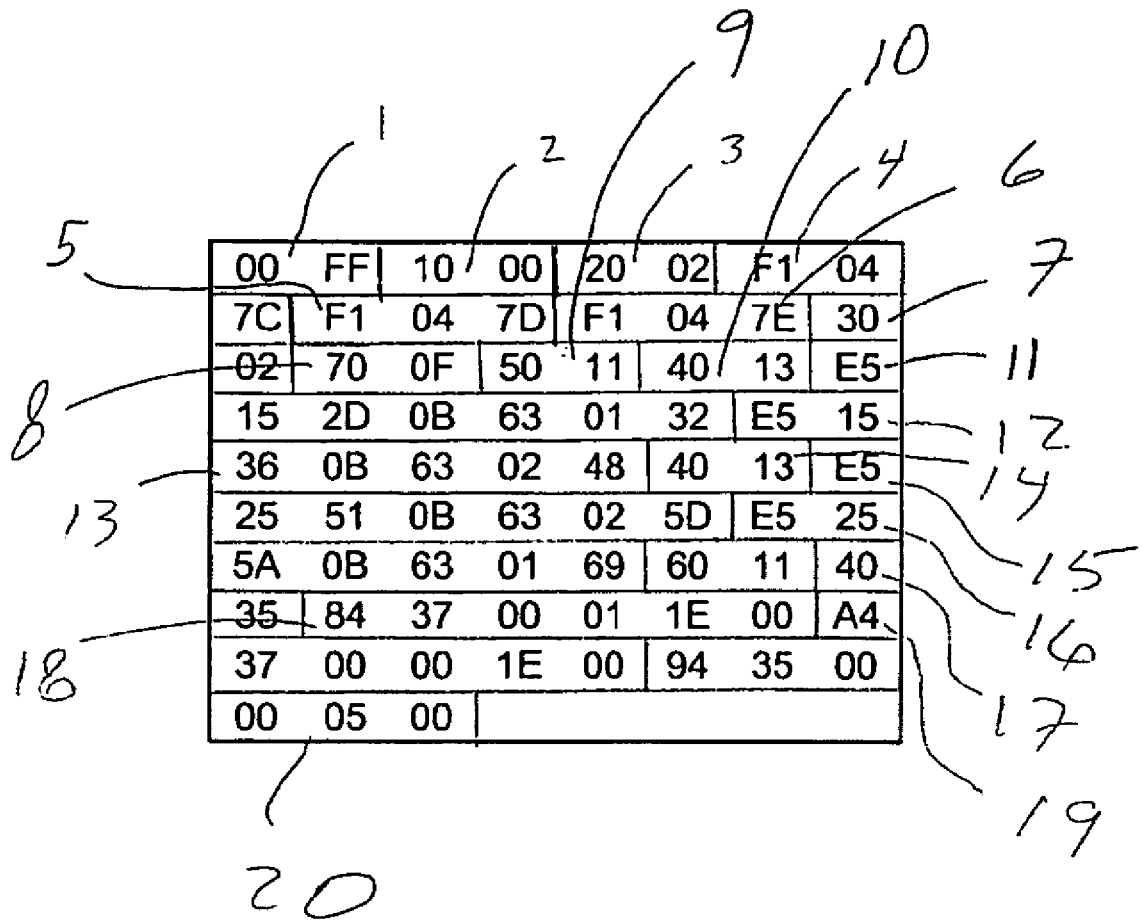
FIG. 15 is a binary form of the query set forth in FIG. 12.

The binary form of the query 1200 set forth in FIG. 12 is shown in FIG. 15. The binary form of the query 1200 is shown in FIG. 15 in a grid in which the first byte of the binary form of the query 1200 (that is, "00") is shown in the upper left corner of the grid (that is, at the cell at row 0 and column 0). Each instruction is surrounded by a box that is referenced in FIG. 15 with the event index for the node (and the complex event represented by that node) to which that instruction corresponds. For example, the first instruction shown in FIG. 15 is the instruction that corresponds to the node 1 shown in FIG. 14. The first instruction is "00 FF", where the first 4 bits of the first byte ("0") is the opcode for a SUBSCRIBE DEO instruction, the second 4 bits of the first byte ("0") is the size of any operands for that opcode (which is zero because there are no operands for that opcode), and the second byte is the event identifier for that instruction's parent event (which is "FF" for the first instruction). The eleventh instruction shown in FIG. 15, for example, is the instruction that corresponds to node 11 shown in FIG. 14. The eleventh instruction is "E5 15 2D 0B 63 01 32", where the first 4 bits of the first byte ("E") is the opcode for the EVENT external-event operator shown in FIG. 11, the second 4 bits of the first byte ("5") is the number of operands, in bytes, for this opcode, and the second byte ("15") is the event identifier, in hexadecimal notation, for that instruction's parent event. The next five bytes (that is, the first three operands for this instruction) specify a particular event: when parameter "45" ("2D" in hexadecimal notation) associated with (opcode "B") region "99" ("63" in hexadecimal notation) is greater than (opcode "01") "50" ("32" in hexadecimal notation).

In this example, the binary form of the query 1200 is injected into the wireless sensor network 100. As the query 1200 propagates among the nodes of the wireless sensor network 100, each node that receives binary form of the query 1200 from a peer node parses the binary form of the query 1200 and determines if that receiving node is able to act as a source entity for any of the simple events (specified by simple-event instructions 1104) specified in the binary form of the query 1200. If the receiving node is able to act as a source entity for such a simple event, the receiving node informs the peer node from which the receiving node received the binary form. As this process plays out throughout the network 100, a series of recursive subscriptions are formed, as managed by the DEV layer 704 of the data management stack 700. FIG. 16 illustrates one example of a set of recursive subscriptions that can result from the query 1200 of FIG. 12. As shown in FIG. 16, a set of eight subscriptions (labeled S1 through S8 in FIG. 16) are generated in order to satisfy the query 1200. In this example, the query 1200 is injected into the wireless sensor network 100 from the base station 104 and the base station 104, in this example, is the sink entity for the original subscription generated from the query 1200 (which is subscription S1 in FIG. 16). The source entity for the subscription S1 is an intermediary node (labeled node IM1 in FIG. 16). The node IM1 publishes events related to parameters 124, 125, and 126 when the WHEN clause and the LIFETIME, EVERY, and ACTIVATE clauses of the subscription S1 are all true. In this example, the node IM1 is able to act as a source of the time events specified in the LIFETIME, EVERY, and ACTIVATE clauses of the subscription S1. The node IM1 is a sink entity for a subscription S2 for an event related to parameter 124, a sink entity for a subscription S3 for an event related to parameter 125, and a sink entity for subscription S4 for an event related to parameter 126.

In this example, the source entity for subscription S2 is the node in the wireless sensor network 100 that is the data source for parameter 124 (labeled node 124 in FIG. 16). Node 124 publishes events related to parameter 124 when the WHEN clause and the LIFETIME, EVERY, and ACTIVATE clauses of subscription S2 are all true. In this example, the node 124 is able to act as a source of the time events specified in the LIFETIME, EVERY, and ACTIVATE clauses of the subscription S2. The node 124 is a sink entity for a subscription S5 for an event related to parameter 45 of region 99, a sink entity for a subscription S6 for an event related to parameter 54 of region 99, a sink entity for subscription S7 for an event related to parameter 81 of region 99, and a sink entity for a subscription S8 for an event related to parameter 90 of region 99.

In this example, the source entity for subscription S3 is the node in the wireless sensor network 100 that is the data source for parameter 125 (labeled node 125 in FIG. 16). Node 125 publishes events related to parameter 125 when the WHEN clause and the LIFETIME, EVERY, and ACTIVATE clauses of subscription S3 are all true. In this example, the node 125 is able to act as a source of the time events specified in the LIFETIME, EVERY, and ACTIVATE clauses of subscription S3. The node 125 is also a sink entity for subscription S5, a sink entity for subscription S6, a sink entity for subscription S7, and a sink entity for subscription S8.

In this example, the source entity for subscription S4 is the node in the wireless sensor network 100 that is the data source for parameter 126 (labeled node 126 in FIG. 16). Node 126 publishes events related to parameter 126 when the WHEN clause and the LIFETIME, EVERY, and ACTIVATE clauses of subscription S4 are all true. In this example, the node 126 is able to act as a source of the time events specified in the LIFETIME, EVERY, and ACTIVATE clauses of subscription S4. The node 126 is also a sink entity for subscription S5, a sink entity for subscription S6, a sink entity for subscription S7, and a sink entity for subscription S8.

In this example, the source entity for subscription S5 is the node in the wireless sensor network 100 that is the data source for parameter 45 of region 99 (labeled node 45 in FIG. 16). Node 45 publishes events related to parameter 45 of region 99 when the WHEN clause and the LIFETIME, EVERY, and ACTIVATE clauses of subscription S5 are all true. In this example, the node 45 is able to act as a source of the time events specified in the LIFETIME, EVERY, and ACTIVATE clauses of subscription S5 and the data event specified in the WHEN clause of subscription S5.

In this example, the source entity for subscription S6 is the node in the wireless sensor network 100 that is the data source for parameter 54 of region 99 (labeled node 54 in FIG. 16). Node 54 publishes events related to parameter 54 of region 99 when the WHEN clause and the LIFETIME, EVERY, and ACTIVATE clauses of subscription S6 are all true. In this example, the node 54 is able to act as a source of the time events specified in the LIFETIME, EVERY, and ACTIVATE clauses of subscription S6 and the data event specified in the WHEN clause of subscription S6.

In this example, the source entity for subscription S7 is the node in the wireless sensor network 100 that is the data source for parameter 81 of region 99 (labeled node 81 in FIG. 16). Node 81 publishes events related to parameter 81 of region 99 when the WHEN clause and the LIFETIME, EVERY, and ACTIVATE clauses of subscription S7 are all true. In this example, the node 81 is able to act as a source of the time events specified in the LIFETIME, EVERY, and ACTIVATE clauses of subscription S7 and the data event specified in the WHEN clause of subscription S7.

In this example, the source entity for subscription S8 is the node in the wireless sensor network 100 that is the data source for parameter 90 of region 99 (labeled node 90 in FIG. 16). Node 90 publishes events related to parameter 90 of region 99 when the WHEN clause and the LIFETIME, EVERY, and ACTIVATE clauses of subscription S8 are all true. In this example, the node 90 is able to act as a source of the time events specified in the LIFETIME, EVERY, and ACTIVATE clauses of subscription S8 and the data event specified in the WHEN clause of subscription S8.

When nodes 45 determines that the LIFETIME, EVERY, ACTIVATE, and WHEN clauses of subscription S5 are all true, node 45 (which implements the source entity for subscription S5) publishes an event related to parameter 45 of region 99 to the sink entities of subscription S5. When node 54 determines that the LIFETIME, EVERY, ACTIVATE and WHEN clauses of subscription S6 are all true, node 54 (which implements the source entity for subscription S6) publishes an event related to parameter 54 of region 99 to the sink entities of subscription S6. When node 81 determines that the LIFETIME, EVERY, ACTIVATE and WHEN clauses of subscription S7 are all true, node 81 (which implements the source entity for subscription S7) publishes an event related to parameter 81 of region 99 to the sink entities of subscription S7. When node 90 determines that the LIFETIME, EVERY, ACTIVATE and WHEN clauses of subscription S8 are all true, node 90 (which implements the source entity for subscription S8) publishes an event related to parameter 90 of region 99 to the sink entities of subscription S8. The sink entities for subscriptions S5, S6, S7, and S8 are implemented on node 124, node 125, and node 126, respectively.

When node 124 determines that the LIFETIME, EVERY, and ACTIVATE clauses of subscription S2 are all true and receives information from node 45 and node 54 or from node 81 and node 90 indicating that the WHEN clause of subscription S2 is true, node 124 (which implements the source entity for subscription S2) publishes an event related to parameter 124 to the sink entity of subscription S2 (which is implemented on node IM1).

When node 125 determines that the LIFETIME, EVERY, and ACTIVATE clauses of subscription S3 are all true and receives information from node 45 and node 54 or from node 81 and node 90 indicating that the WHEN clause of subscription S3 is true, node 125 (which implements the source entity for subscription S3) publishes an event related to parameter 125 to the sink entity of subscription S3 (which is implemented on node IM1).

When node 126 determines that the LIFETIME, EVERY, and ACTIVATE clauses of subscription S4 are all true and receives information from node 45 and node 54 or from node 81 and node 90 indicating that the WHEN clause of subscription S4 is true, node 126 (which implements the source entity for subscription S4) publishes an event related to parameter 126 to the sink entity of subscription S4 (which is implemented on node IM1).

When node IM1 determines that the LIFETIME, EVERY, and ACTIVATE clauses of subscription S1 are all true and receives information from node 124, node 125, or node 126 indicating that the WHEN clause of subscription S1 is true (the WHEN clause of subscription S1 is the same as the WHEN clause in subscriptions S2, S3, and S4), node IM1 (which implements the source entity for subscription S1) publishes an event related to parameter 124 (if node IM1 has received a publication for subscription S2), parameter 125 (if node IM1 has received a publication for subscription S2), and/or parameter 126 (if node IM1 has received a publication for subscription S2) to the sink entity of subscription S1 (which is implemented on the base station 104).

Figure 17:
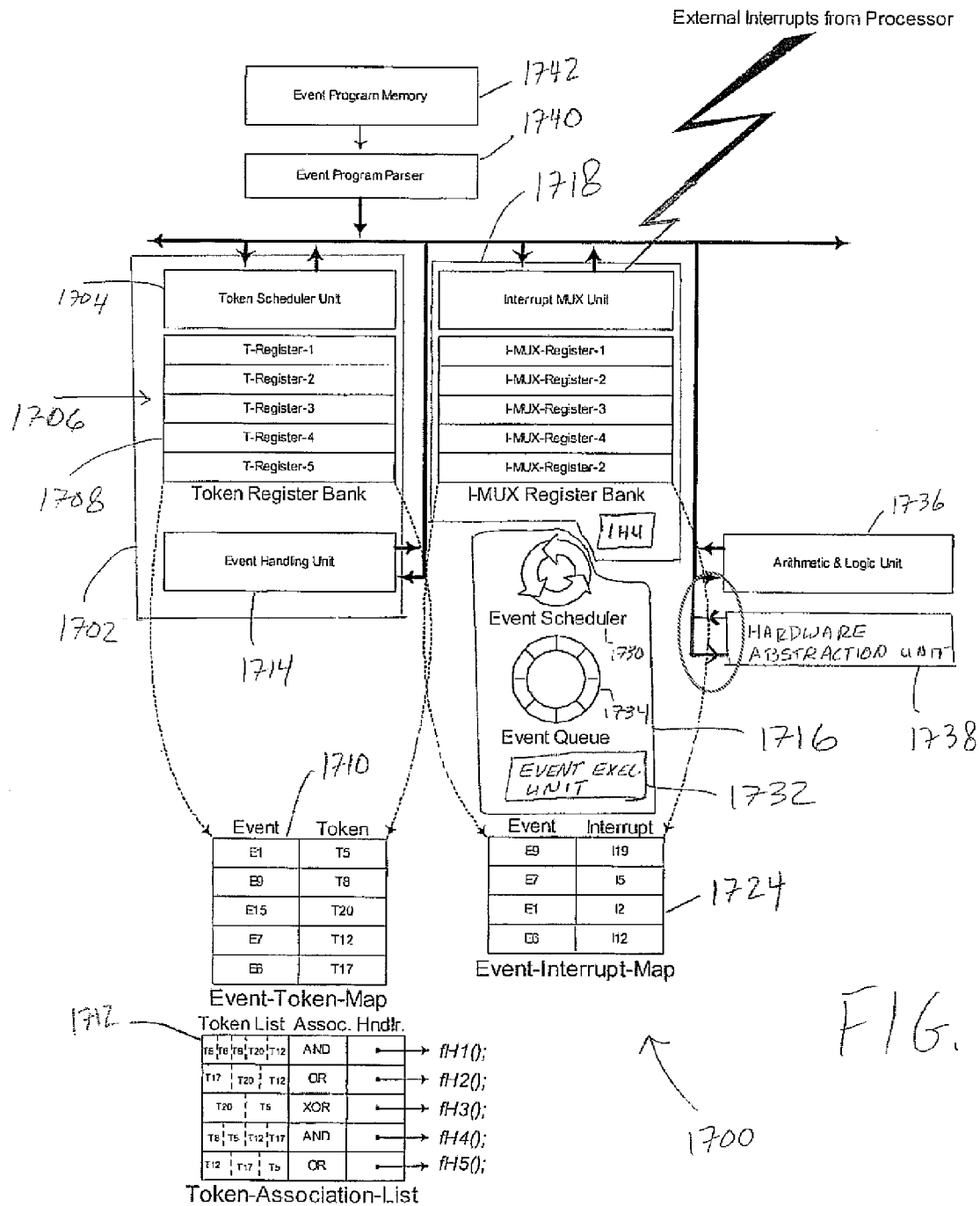
FIG. 17 is a block diagram of one embodiment of a virtual machine for use in a wireless sensor network.

FIG. 17 is a block diagram of one embodiment of a virtual machine 1700 for use in a wireless sensor network. The embodiment of virtual machine 1700 shown in FIG. 17 is described here as being implemented using the wireless sensor network 100 and wireless sensor node 102 of FIGS. 1 and 2, respectively. Other embodiments are implemented in other ways. The virtual machine 1700 shown in FIG. 17 executes one or more "event programs" as described below.

In such an embodiment, each event program is the binary form of a subscription that has been installed on the particular node on which the virtual machine 1700 is implemented (also referred to here as the "target" node) and comprises a set of instructions (for example, from the instruction set 1100 shown in FIG. 11). Each event program identifies one or more simple events (for example, identified using the simple-event instructions 1104 described above). In the embodiment shown in FIG. 17, the occurrence of each simple event is signaled to the virtual machine 1700 by an interrupt generated by the underlying hardware of the target node. As described above, each discrete event operator instruction 1102 is also viewed, in the context of the virtual machine 1700, as a complex event. When each discrete event operator instruction 1104 is executed, particular processing is performed by the target node. This processing that is performed when each discrete event operator instruction 1104 is executed is also referred to here as the "event handler" for the internal event associated with that discrete event operator instruction 1104.

The embodiment of a virtual machine 1700 shown in FIG. 17 employs techniques used to implement Petri nets. Petri nets are typically used to model systems with interacting concurrent components where the transfer of information or materials from one component to another component requires that the activities of the involved components be synchronized during the interaction. In such a system, it is often the case that one component must wait for another component in order for the two components to remain synchronized. The timing of actions by different components may be very complex and the resulting interactions between components difficult to describe and synchronize. Petri nets provide a useful mathematical foundation to manage these kinds of systems.

A Petri net can be represented as a graph with two types of nodes—"places" and "transitions." Each transition has a set of input places and a set of output places. In the graph for a Petri net, each input place is shown as being connected to the transition by an arc that is directed from the input place to the transition. Similarly, each output place is shown as being connected to the transition by an arc that is directed from the transition to the output place. Places can be "marked" by "tokens." Each place can hold an integer number of tokens. Transitions whose input places are all marked by at least one token are said to be "enabled" and are fired. When a transition is fired, a token is placed in each of the output places for that transition.

In the embodiment of virtual machine 1700 shown in FIG. 17, each event (including each simple event and each complex event) in the event program is modeled as a "place." The event handler for each complex event (that is, each discrete event operator instruction 1104) is modeled as a "transition." Each transition associated with a particular complex event has a set of input places comprising the child events of that complex event. Each transition associated with a particular complex event also comprises an output place that corresponds to the parent event of that complex event. The event handler associated with each transition is executed when the transition is enabled. Each transition is enabled when a logical function associated with that transition evaluates to "true." This logical function is defined, in this embodiment, by a logical operator (for example, AND, OR, or XOR) that is used to logically combine all the input places for the transition, where each input place has a logical value of "true" if the input place is marked and has a logical value of "false" if the input place is not marked. Each such logical function, in other words, implements the event filter condition for the associated complex event.

In such an embodiment, each place (that is, each event) is allocated a data structure that is used to determine if that place has been marked. This data structure is referred to here as a "token data structure" or just a "token." A place is marked by storing a value corresponding to logical true (for example, a value "1") in the token for that place. A place is not marked when the token for that place contains a value corresponding to logical false (for example, a value of "0"). The set of tokens allocated to a set of input places for a given transition (that is, a given event handler) is also referred to here as the set of "input tokens" for that transition. Likewise, the token allocated to the output place of a given transition is also referred to here as the "output token" for that transition.

The virtual machine 1700 comprises a token management subsystem 1702 for allocating and managing the token data structures used by the virtual machine 1700. The number of tokens that can be allocated in the virtual machine 1700 at any time is limited. The token management subsystem 1702 includes a token scheduler unit 1704 and a token register bank 1706. The token register bank 1706 comprises a set of bit-addressable token registers 1708 in which the tokens that are allocated by the token management subsystem 1702 are stored. In the embodiment shown in FIG. 17, the token register bank 1706 includes five token registers 1708, though the token register bank 1706 includes a different number of token registers 1708 in other embodiments. The bits contained within each of the token registers 1708 are allocated by the token scheduler unit 1704 based on considerations such as runtime management of tokens that have been allocated, the allocation of tokens to events such that each token resolves to a unique address, and/or the scheduling of tokens for new events that are generated at run time.

The token management subsystem 1702 also allocates and manages a data structure (referred to here as the "event-token map" 1710) that maps each event in the event program to the location within the token register bank 1706 of the token allocated for that event. The token management subsystem 1702 also allocates and manages a data structure (referred to here as the "token-association list" 1712) that is used in determining when a particular event handler should be executed.

In the embodiment shown in FIG. 17, the token-association list 1712 is implemented as a table in which each event handler in the event program is assigned a row in the table. As noted above, each event handler is modeled as a transition that has a set of input places and an output place. Each row contains a handle (or other reference) to the program instructions that comprise the event handler associated with that row. Each row also specifies the address (or other identifier) of the input tokens for the event associated with that row (labeled "Token List" in FIG. 17). Each row also specifies the logical operator (for example, AND, OR, or XOR) that is used to logically combine the input places for the transition associated with that row's event (labeled "Association" in FIG. 17). The input places are logically combined to determine if the transition associated with each row is enabled and, as a result, the event handler associated with that transition should be executed. This operation is also referred to here as "evaluating" that row of the token-association list 1712. If the result of logically combining the input tokens is "true", then that event handler is executed. When the event handler is executed for a particular complex event, the event handler, among other things, clears (that is, unmarks) the input tokens of that complex event and marks the output token of that complex event.

Every row in the token-association list 1712 is evaluated when any token within the token register bank 1706 has been marked. The token management subsystem 1702 comprises an event handling unit 1714 that performs such processing using the token-association list 1712. That is, the event handler 1714, when any token in the token register bank 1706 is marked, evaluates each row in the token-association list 1712. If a row evaluates to true, the event handling unit 1714 determines the address for the event handler associated with that row using the handle (or other reference) contained in that row and passes the address to the event-execution management subsystem 1716 (described below) to schedule the event handler for execution thereby.

The virtual machine 1700 also comprises an interrupt management subsystem 1718 that allocates and handles interrupts and timers that are assigned to simple events specified in an event program. The number of interrupts and timers that are available on the target node is limited. The interrupt management subsystem 1718 comprises an interrupt multiplexer register bank 1720. The interrupt multiplexer register bank 1720 comprises a set of interrupt multiplexer registers 1722. In the embodiment shown in FIG. 17, the interrupt multiplexer register bank 1720 includes five interrupt multiplexer registers 1722, though the interrupt multiplexer register bank 1720 includes a different number of interrupt multiplexer registers 1722 in other embodiments.

In the embodiment shown in FIG. 17, the interrupt management subsystem 1718 comprises an interrupt multiplexer unit 1726 that allocates the physical interrupts and timers to the simple events specified in each event program. For example, the interrupt multiplexer unit 1726 performs such processing when each event program is installed on the target node. The interrupt multiplexer unit 1726 identifies all simple events that are data events (as opposed to timer events) and allocates a physical interrupt to each data event. The interrupt multiplexer unit 1726 also configures the underlying hardware of the target node (for example, the programmable processor 206) to generate that physical interrupt only when the condition specified for that data event is true. The interrupt multiplexer unit 1726 also identifies all the simple events that are timer events (as opposed to data events) and allocates a hardware timer to that timer event. For timer events, the interrupt multiplexer unit 1726 also allocates physical interrupt to the timer event and configures the underlying hardware of the target node (for example, the programmable processor 206) to generate the physical interrupt at the appropriate time as specified in the timer event.

The interrupt multiplexer unit 1726 allocates and maintains a data structure (referred to here as the "event-interrupt map" 1724) that maps each simple event specified in the event program to the physical interrupt allocated to that event. Each time a physical interrupt occurs, the interrupt multiplexer unit 1726 determines if that physical interrupt has been allocated to any event. If the physical interrupt has been allocated to one or more of the events, the interrupt multiplexer unit 1726 "routes" the interrupt to an interrupt handling unit (IHU) 1728 included in the interrupt management subsystem 1710. The interrupt handling unit 1728 executes a generic interrupt service routine (ISR) that evaluates each entry in the event-interrupt map 1724. If the physical interrupt that occurred is contained in a particular entry in the event-interrupt map 1724, the generic ISR marks the token allocated to the event specified in that entry of the event-interrupt map 1724. The generic ISR uses the event-token map 1710 to determine which token has been allocated to the event specified in that entry of the event-interrupt map 1724. As noted above, whenever a token is marked, the event handling unit 1714 evaluates each row in the token-association list 1712 to determine if any event handlers should be scheduled for execution by the event-execution management subsystem 1716.

The virtual machine 1700, in the embodiment shown in FIG. 17, further comprises an event-execution management subsystem 1716. The event-execution management subsystem 1716 allocates and manages memory in which the program logic that implements each event handler installed on the target node is stored. The event-execution management subsystem 1716 also receives requests from the token management subsystem 1702 to schedule a particular event handler for execution. The event-execution management subsystem 1716 comprises an event scheduler 1730 that performs the scheduling of event handlers. The event scheduler 1730 schedules event handlers for execution based on factors such as priority, time to execute and system resources. The event-execution management subsystem 1716 comprises an event-execution unit 1732 that interacts with the underlying hardware (for example, the programmable processor 206) of the target node to execute the program logic of the event handlers in accordance with the schedule established by the event scheduler 1730. The event-execution management subsystem 1716, in the embodiment shown in FIG. 17, comprises an event queue 1734 that is used by the event-execution scheduler 1730 and the event-execution unit 1732 to schedule and execute the program logic of the event handlers, respectively.

In the embodiment shown in FIG. 17, the virtual machine 1700 comprises an arithmetic and logic unit 1736 that the event-execution management subsystem 1716 uses to interact with the underlying programmable processor 206 of the target node in order to execute the program logic of the various event handlers installed on the target node. The virtual machine 1700 further comprises a hardware abstraction unit 1738 that is used to access the other parts of the underlying hardware of the target node. For example, in the embodiment shown in FIG. 17, the interrupt management subsystem 1710 uses the hardware abstraction unit 1738 to communicate with the underlying hardware of the target node about the physical interrupts and hardware timers used by the virtual machine 1700.

In the embodiment shown in FIG. 17, the virtual machine 1700 also comprises an event parser 1740 that parses each event program that is installed on the target node. During parsing, the event program is stored in event program memory 1742. In one embodiment, the event program memory 1742 is located in a data structure allocated in the memory 208 of the target node. In the embodiment shown in FIG. 17, each event program is parsed in two steps. During the first step, the event parser 1740 identifies each discrete event operator instruction 1102 in the event program. For each discrete event operator instruction 1102 that is identified, the event parser 1740 causes the token scheduler unit 1704 to allocate a token for that complex event and causes the event-execution management subsystem 1716 to store the program logic for that event handler. Also, during the first step, the event parser 1740 identifies each simple-event instruction 1104 in the event program. For each simple-event instruction 1104 that is identified, the event parser 1740 causes the token scheduler unit 1704 to allocate a token for that simple event and causes the interrupt management subsystem 1718 to allocate a physical interrupt (and a hardware timer, if the simple event is a timer event). After all of the tokens have been allocated for the event program, the event parser 1740 performs the second step of the parsing process. In the second step, the event parser orders and sequences the tokens that have been allocated by causing the token scheduler unit 1704 to populate a row in the token-association list 1712 for each discrete event operator instruction 1102. For each discrete event operator instruction 1102, a row in the token-association list 1712 is populated with the set of input tokens for that discrete event operator instruction 1102, the logical operator for combining the set of input tokens to determine if the associated event handler should be executed, and a handle (or other reference) to the program logic for that event handler.

In one implementation, the virtual machine 1700 is implemented using the "TinyOS" operating system developed at the University of California at Berkeley. The event scheduler 1730, in such an implementation, is implemented using the event scheduler component of the TinyOS operating system.

In such an implementation, the round-robin scheduling logic of the TinyOS scheduler is extended to implement a priority-based scheduling algorithm for use with the virtual machine 1700 of FIG. 17. The hardware abstraction unit 1738 of the virtual machine 1700 is implemented, in such an implementation, using the hardware-abstraction-layer of the TinyOS operating system.

Figure 18:
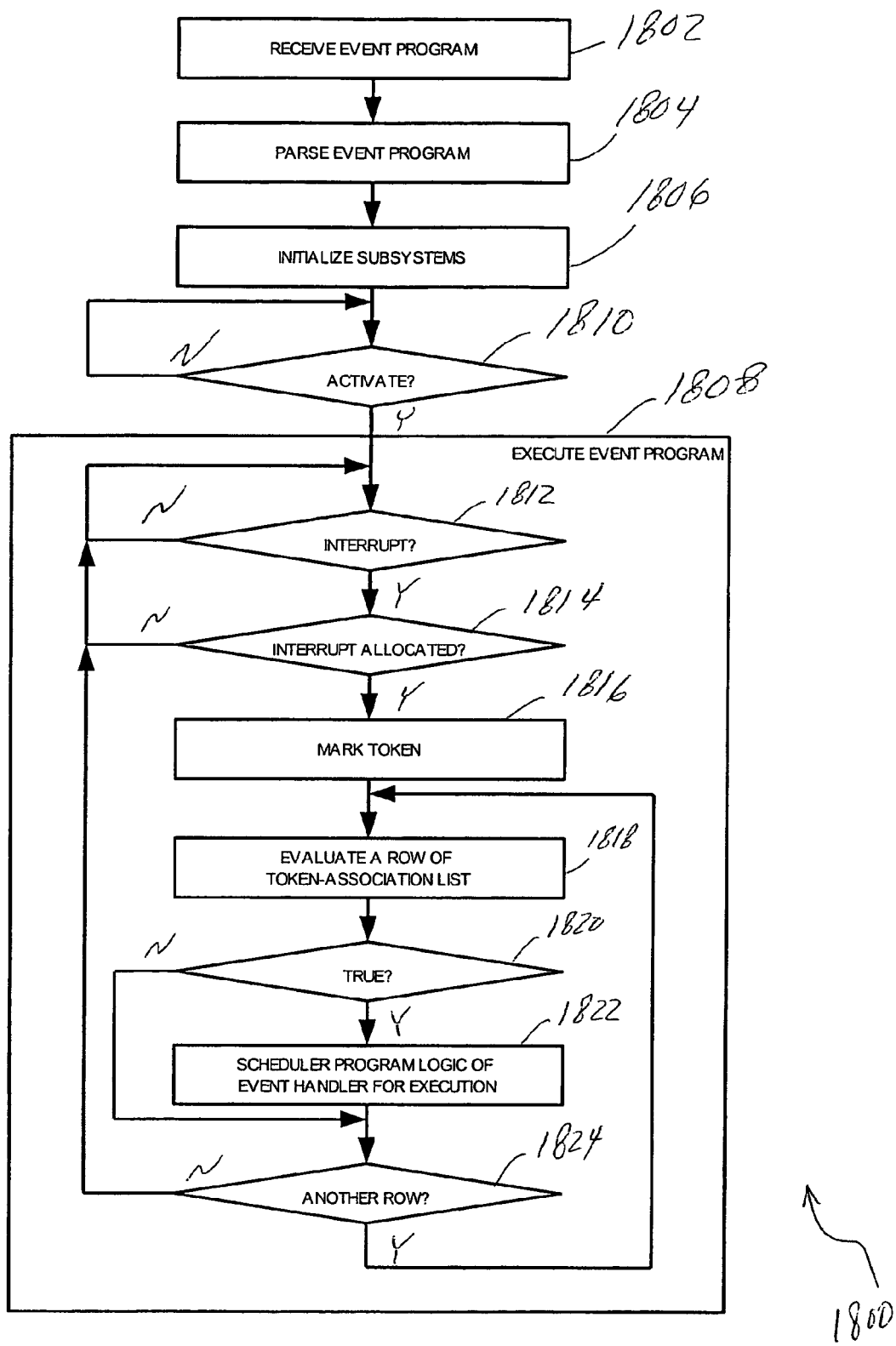
FIG. 18 is a flow chart illustrating the processing of an event program by the embodiment of the virtual machine shown in FIG. 17.

FIG. 18 is a flow chart illustrating the processing of an event program by the embodiment of the virtual machine 1700 shown in FIG. 17. The processing described here as being performed by the virtual machine 1700 is carried out by the underlying hardware of the target node (for example, by the programmable processor 206). The underlying target node, in one implementation, includes a scheduling mechanism that is able to, among other things, allocate processing resources between the processing performed in method 1800, the program logic for any event handlers that are executed by the event execution unit 1732, and any processing performed in order to generate interrupts and management hardware timers.

Method 1800 comprises receiving the event program (that is, the binary form of a subscription) at the virtual machine (block 1802). The event program, in this embodiment, is expressed as a set of instructions, comprising one or more discrete event operator instructions 1102 and simple-event instructions 1104 of the type shown in FIG. 11. The event program is received by the target node using the underlying networking and routing layer implemented on the target node and included in the physical layer 712 of the data management stack 700. The event program is parsed by the event parser 1740 of the virtual machine 1700 (block 1804). In this embodiment, the event program is parsed using the two-step process described above. In the first step, the tokens for each event of the event program (that is, for each instruction) are allocated, the event handler for each discrete event operator instruction 1102 is allocated, and the interrupts and hardware timers are allocated for the simple events specified in the event program. In the second step, the tokens are ordered and sequenced by populating the rows of the token-association list 1712 with the set of input tokens for the complex event associated with that row, the logical operator for combining the set of input tokens, and the handle (or other reference) to the program logic for the event handler for that event.

After parsing the event program, the subsystems of the virtual machine 1700 are initialized (block 1806). For example, the token registers 1708, the interrupt multiplexer registers 1722, and the event scheduler 1730 are initialized along with the underlying hardware of the target node (for example, the processor 206 that generates interrupts and the hardware timers 222).

After the parsing and initialization is complete, the event program is executed by the virtual machine 1700 (block 1808). In the embodiment shown in FIG. 18, the event program is not executed until the ACTIVATE event specified in the event program has occurred (checked in block 1810). In this embodiment, the ACTIVATE event is allocated an interrupt and hardware timer by the interrupt management subsystem 1718 and the underlying hardware of the target node is initialized to generate this interrupt when the condition specified in the ACTIVATE instruction of the event program is true.

Executing the event program comprises determining when an interrupt has been generated (block 1812). When an interrupt is generated, the interrupt is checked to determine if that type of interrupt (indicated by an interrupt identifier) has been allocated to an event in the event program (block 1814). In this embodiment, the interrupt multiplexer unit 1726 makes this determination. If that type of interrupt has not been allocated to an event in the event program, the interrupt is not processed (returning back to block 1812). If that type of interrupt has been allocated, the token associated with the event allocated to that interrupt is marked (block 1816). In this embodiment, if that type of interrupt has been allocated, the interrupt multiplexer unit 1726 routes the interrupt to the interrupt handler unit 1728. The interrupt handler unit 1728 executes the generic interrupt service routine, which uses the event-interrupt map 1724 to determine which event is associated with that interrupt. The generic interrupt service then marks the token allocated to that event, which is stored in the token register bank 1706.

After the token is marked, each row in the token-association list 1712 is evaluated (block 1818) and if the row evaluates to true (checked in block 1820), the event handler specified by that row is scheduled for execution (block 1822). When all rows of the token-association list 1712 have been evaluated (checked in block 1824), method 1800 waits for the next interrupt (returning to block 1812). This is done until the event-program is terminated, for example, by an event handler (for example, by an event handler associated with a timer event).

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. A wireless sensor node, comprising:
    a wireless transceiver to communicate over a wireless communication link with at least one other node in a wireless sensor network;
    a sensor interface to receive sensor data from a sensor; and
    a programmable processor coupled to the sensor interface and the wireless transceiver, wherein the programmable processor executes program instructions that implement a virtual machine for executing an event program that is generated from a query;

wherein the event program comprises a plurality of instructions, each instruction being associated with an event;

wherein the virtual machine allocates a token data structure for each event and manages the execution of the plurality of instructions using the token data structures; and wherein each of a subset of the events has an associated event handler, wherein each event handler has a set of input token data structures and an output token data structure associated therewith, wherein the virtual machine causes the event handler to be executed by the wireless sensor node when a predetermined logical relationship associated with that event handler exists between the set of input token data structures associated with that event handler.

2. The wireless sensor node of claim 1, wherein when each event occurs, the virtual machine marks the token data structure allocated to that event.

3. The wireless sensor node of claim 1, wherein the virtual machine allocates an interrupt to at least one event and configures the wireless sensor node to generate an interrupt when that event occurs, wherein when the interrupt is generated, the virtual machine marks the token data structure allocated to that event.

4. The wireless sensor node of claim 1, wherein the virtual machine allocates a hardware timer to at least one event and configures the wireless sensor node to generate an interrupt when that event occurs, wherein when the interrupt is generated, the virtual machine marks the token data structure allocated to that event.

5. The wireless sensor node of claim 1, wherein when an event occurs, the virtual machine determines for each event handler if the predetermined logical relationship associated with that event handler exists and, if the predetermined logical relationship associated with that event handler exists, causes the event handler to be executed by the wireless sensor node.

6. The wireless sensor node of claim 1, wherein, for each event handler, the predetermined logical relationship for that event handler comprises logically combining each of the set of input token data structures associated with that event handler using a predetermined logical operator that is associated with that event handler.

7. The wireless sensor node of claim 6, wherein the predetermined logical operator associated with each event handler comprises one of an AND logical operator, an OR logical operator, and a XOR logical operator.

8. A wireless sensor node, comprising:

a wireless transceiver to communicate over a wireless communication link with at least one other node in a wireless sensor network;

a sensor interface to receive sensor data from a sensor; and a programmable processor coupled to the sensor interface and the wireless transceiver, wherein the programmable processor uses a Petri net-based model to execute an event program that specifies a set of events, wherein the event program is generated from a query;

wherein the programmable processor executes a virtual machine that implements the Petri net-based model; and wherein each of a subset of the events has an associated event handler, wherein each event handler has a set of input token data structures and an output token data structure associated therewith, wherein the virtual machine causes the event handler to be executed by the wireless sensor node when a predetermined logical relationship associated with that event handler exists between the set of input token data structures associated with that event handler.

9. The wireless sensor node of claim 8, wherein each of the set of events has a token data structure allocated thereto, wherein the Petri net-based model is a function of the token data structures.

* * * * *